(12) United States Patent  
Jiang

(10) Patent No.: US 12,375,802 B2
(45) Date of Patent: Jul. 29, 2025

(54) PHOTOGRAPHING METHOD AND ELECTRONIC DEVICE

(71) Applicant: HUAWEI TECHNOLOGIES CO., LTD., Guangdong (CN)

(72) Inventor: Dongsheng Jiang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 151 days.

(21) Appl. No.: 18/005,397

(22) PCT Filed: Jul. 8, 2021

(86) PCT No.: PCT/CN2021/105311
§ 371 (c)(1),
(2) Date: Jan. 13, 2023

(87) PCT Pub. No.: WO2022/012418
PCT Pub. Date: Jan. 20, 2022

(65) Prior Publication Data
US 2023/0276125 A1 Aug. 31, 2023

(30) Foreign Application Priority Data
Jul. 16, 2020 (CN) .......................... 202010686011.5

(51) Int. Cl.
H04N 23/667 (2023.01)
G06F 3/01 (2006.01)
(Continued)

(52) U.S. Cl.
CPC ........... H04N 23/667 (2023.01); G06F 3/017 (2013.01); G06T 7/62 (2017.01); G06V 10/44 (2022.01);
(Continued)

(58) Field of Classification Search
CPC .... H04N 23/667; H04N 23/632; H04N 23/61; H04N 23/631; H04N 23/633;
(Continued)

(56) References Cited

U.S. PATENT DOCUMENTS

2004/0233296 A1* 11/2004 Sugimoto ............ H04N 1/0044
348/222.1
2011/0026780 A1 2/2011 Corcoran et al.
(Continued)

FOREIGN PATENT DOCUMENTS

| CN | 106851104 A | 6/2017 |
|----|-------------|--------|
| CN | 107896304 A | 4/2018 |

(Continued)

OTHER PUBLICATIONS

Office Action issued in CN202010686011.5, dated Jun. 27, 2022, 10 pages.
(Continued)

Primary Examiner — Albert H Cutler

(57) ABSTRACT

A photographing method and an electronic device are disclosed. The electronic device may determine feature information of each of at least one photographed object included in a photographing scene, and then determine at least one target photographing mode based on the feature information. Then, the electronic device obtains at least one image of the photographing scene in response to a first photographing instruction entered by a user. An imaging effect of the at least one image corresponds to the at least one target photographing mode. The electronic device may autonomously determine a photographing mode that better matches the photographing scene. This achieves high intelligence, and can obtain a plurality of images with different imaging effects by performing photographing once, thereby saving photographing resources and improving user experience.

20 Claims, 26 Drawing Sheets

(51) Int. Cl.
  *G06T 7/62* (2017.01)
  *G06V 10/44* (2022.01)
  *G06V 10/74* (2022.01)
  *H04N 23/63* (2023.01)
  *H04N 23/80* (2023.01)

(52) U.S. Cl.
  CPC ......... *G06V 10/761* (2022.01); *H04N 23/632* (2023.01); *H04N 23/80* (2023.01)

(58) Field of Classification Search
  CPC ...... H04N 23/80; H04N 23/90; H04N 5/2624; H04N 23/611; H04N 23/743; G06F 3/017; G06T 7/62; G06V 10/44; G06V 10/761; G06N 3/0895; G06N 20/00
  See application file for complete search history.

(56) References Cited

U.S. PATENT DOCUMENTS

| | | | |
|---|---|---|---|
| 2011/0193881 A1 | 8/2011 | Rydenhag | |
| 2014/0002693 A1* | 1/2014 | Nestares | H04N 23/743 348/E5.053 |
| 2014/0184848 A1* | 7/2014 | Shimosato | H04N 23/632 348/222.1 |
| 2014/0368695 A1* | 12/2014 | Sako | H04N 9/7904 348/231.99 |
| 2015/0015736 A1 | 1/2015 | Muukki et al. | |
| 2017/0019597 A1 | 1/2017 | Oyama | |
| 2017/0094171 A1* | 3/2017 | Lim | H04N 23/80 |
| 2018/0227478 A1* | 8/2018 | Li | H04N 23/951 |
| 2019/0075240 A1* | 3/2019 | Thai | G06F 1/1618 |
| 2019/0222744 A1* | 7/2019 | Qin | G06T 3/10 |
| 2020/0021733 A1* | 1/2020 | Liu | H04N 23/635 |
| 2021/0092280 A1* | 3/2021 | Nishimura | G06N 3/04 |

FOREIGN PATENT DOCUMENTS

| | | |
|---|---|---|
| CN | 108111754 A | 6/2018 |
| CN | 109257543 A | 1/2019 |
| CN | 110035230 A | 7/2019 |
| CN | 110191276 A | 8/2019 |
| CN | 110769152 A | 2/2020 |

OTHER PUBLICATIONS

Extended European Search Report issued in EP21842084.2, dated Mar. 6, 2024, 18 pages.
Partial European Search Report issued in EP21842084.2, dated Dec. 6, 2023, 18 pages.

* cited by examiner

PHOTOGRAPHING METHOD AND ELECTRONIC DEVICE

CROSS-REFERENCE TO RELATED APPLICATIONS

This application is a National Stage of International Application No. PCT/CN2021/105311, filed on Jul. 8, 2021, which claims priority to Chinese Patent Application No. 202010686011.5, filed on Jul. 16, 2020, both of which are hereby incorporated by reference in their entireties.

TECHNICAL FIELD

Embodiments of this application relate to the photographing field, and in particular, to a photographing method and an electronic device.

BACKGROUND

With development of technologies, a mobile terminal not only has a photographing function, but also can provide a plurality of photographing modes for photographing. Different photographing modes are applicable to different photographing scenes and photographed objects. For example, if a user performs photographing in a first photographing scene by using a first photographing mode, a better imaging effect can be obtained, but if the user performs photographing in a second photographing scene by using the first photographing mode, an imaging effect may be poorer.

In an existing implementation, the mobile terminal performs photographing and imaging in a photographing mode selected by the user. However, the photographing mode selected by the user is not necessarily applicable to a corresponding photographing scene and a photographed object, and consequently, a photographing effect is poor.

SUMMARY

Embodiments of this application provide a photographing method and an electronic device, to resolve a problem that a photographing effect in an existing photographing method is poor.

According to a first aspect, an embodiment of this application provides a photographing method, including: determining feature information of each of at least one photographed object included in a photographing scene, where the feature information includes one or a combination of more of the following: a confidence level of the photographed object, a distance between the photographed object and a camera, and an image size; determining at least one target photographing mode based on the feature information of each of the at least one photographed object; and obtaining at least one image of the photographing scene in response to a first photographing instruction input by a first user, where an imaging effect of the at least one image corresponds to the at least one target photographing mode.

An electronic device that performs this embodiment of this application includes a camera and may support a plurality of photographing modes. The photographing mode is a mode in which the electronic device uses different photographing parameters in different photographing modes from obtaining image data of a photographing scene to final imaging, so that images with different imaging effects can be obtained by performing photographing in the same photographing scene in different photographing modes. Based on this, in this embodiment, before performing photographing, the electronic device may select, based on the feature information of each photographed object in the photographing scene, at least one target photographing mode that better matches the photographing scene from photographing modes supported by the electronic device. Then the electronic device separately generates an image of the photographing scene by using the at least one target photographing mode. The feature information in this embodiment includes one or a combination of more of the following: the confidence level of the photographed object, the distance between the photographed object and the camera, and the image size. The feature information can represent a feature of the photographed object and a matched photographing mode. Therefore, in this embodiment, the electronic device can determine a better matched target photographing mode based on the feature information of the photographed object.

It can be learned that, in an implementation of this embodiment, the electronic device can determine, based on the feature information of the photographed object in the photographing scene, at least one photographing mode that better matches the photographing scene, and further generate an image by using the at least one photographing mode, to obtain a plurality of images with different imaging effects. This not only achieves high intelligence, but also can save photographing resources and improve user experience because a plurality of images with different imaging effects can be obtained by performing photographing once.

In a possible design, the determining at least one target photographing mode based on the feature information of each of the at least one photographed object includes: performing calculation on the feature information of each of the at least one photographed object to obtain a calculation result corresponding to each photographed object; and sequentially selecting a preset quantity of photographing modes in descending order of the calculation results to obtain the at least one target photographing mode. The confidence level is used to represent a level of trust of the photographed object being an object of a type, and a higher confidence level indicates a higher level of trust of the photographed object being the object of the corresponding type. The image size refers to an area occupied by the photographed object in a display interface. In other words, the feature information can represent salience of the photographed object in the photographing scene. Further, the electronic device performs calculation on the feature information of each photographed object, that is, determines salience of each photographed object. The electronic device sequentially selects a preset quantity of photographing modes in descending order of the calculation results, that is, determines the target photographing mode based on a photographing mode corresponding to the salience of the photographed object. It can be learned that, in this implementation, the electronic device can detect the salience of each photographed object in the photographing scene by using deep learning, and further, based on an order of the salience of each photographed object, preferably select a photographing mode that better matches the photographing scene, so that an imaging effect of the photographing scene can be optimized.

In a possible design, the performing calculation on the feature information of each photographed object to obtain a calculation result corresponding to each photographed object includes: calculating a comprehensive score E of the feature information of each photographed object according to an algorithm $E=\alpha x+\beta y+\gamma z$, where x is the confidence level of the photographed object, y is the image size of the photographed object, z is the distance between the photographed object and the camera, α is a first weight of the confidence level of the photographed object, β is a first weight of the image size of the photographed object, γ is a first weight of the distance between the photographed object and the camera, and all of α, β, and γ are values greater than 0 and less than 1; and the sequentially selecting a preset quantity of photographing modes in descending order of the calculation results to obtain the at least one target photographing mode includes: sequentially selecting a preset quantity of confidence levels in descending order of the comprehensive scores E to obtain at least one target confidence level; and determining a photographing mode corresponding to the at least one target confidence level as a target photographing mode, to obtain the at least one target photographing mode. In this implementation, the electronic device can detect the salience of each photographed object in the photographing scene by using deep learning, and further, based on the order of the salience of each photographed object, preferably select the photographing mode that better matches the photographing scene, so that the imaging effect of the photographing scene can be optimized.

In a possible design, the performing calculation on the feature information of each photographed object to obtain a calculation result corresponding to each photographed object includes: calculating, according to an algorithm P=ax+by+cz, a probability value P that each photographed object is a photographed subject, where x is the confidence level of the photographed object, y is the image size of the photographed object, z is the distance between the photographed object and the camera, a is a second weight of the confidence level of the photographed object, b is a second weight of the image size of the photographed object, c is a second weight of the distance between the photographed object and the camera, and all of a, b, and c are values greater than 0 and less than 1; and the sequentially selecting a preset quantity of photographing modes in descending order of the calculation results to obtain the at least one target photographing mode includes: sequentially selecting a preset quantity of photographed objects in descending order of the probability values P to obtain at least one target photographed object; and determining a photographing mode matched when each of the at least one target photographed object is used as a photographed subject, to obtain the at least one target photographing mode.

In some embodiments, when different photographed objects are used as photographed subjects in the photographing scene, photographing modes adapted to the photographing scene are different. Based on this, the electronic device may determine, based on the feature information of each of the at least one photographed object, a probability that the photographed object is used as a photographed subject. Then the electronic device may sequentially select a preset quantity of photographed objects in descending order of probabilities as target photographed objects, and further determine a photographing mode adapted when each target photographed object is used as a photographed subject, to obtain the at least one target photographing mode. In this implementation, the electronic device can detect the salience of each photographed object in the photographing scene by using deep learning, and further, based on the order of the salience of each photographed object, preferably select the photographing mode that better matches the photographing scene, so that the imaging effect of the photographing scene can be optimized.

In a possible design, the obtaining at least one image of the photographing scene in response to a first photographing instruction input by a first user includes: when the at least one target photographing mode includes at least two photographing modes, and the at least two photographing modes are different, obtaining an image of the photographing scene by using each of the at least two photographing modes, to obtain at least two images of the photographing scene. In this implementation, when corresponding to one photographing scene, the electronic device can separately generate one image in one photographing process by using at least two photographing modes, so that a plurality of images with different imaging effects can be obtained by performing photographing once. This not only saves photographing resources, but also can improve user experience.

In a possible design, the obtaining an image of the photographing scene by using each of the at least two photographing modes includes: determining whether framing parameter differences between the at least two target photographing modes are all less than thresholds corresponding to corresponding framing parameters; and if the framing parameter differences between the at least two target photographing modes are all less than the thresholds corresponding to the corresponding framing parameters, performing framing based on framing parameters of any one of the at least two target photographing modes to obtain framed image data, and separately processing the image data according to image processing algorithms of the at least two target photographing modes to obtain at least two images of the photographing scene; or if any framing parameter difference between the at least two target photographing modes is greater than a threshold corresponding to a corresponding framing parameter, separately performing framing based on framing parameters of the at least two target photographing modes to obtain two pieces of image data, and processing corresponding image data according to image processing algorithms of the at least two target photographing modes to obtain at least two images of the photographing scene.

A process in which the electronic device invokes the camera to obtain an optical signal in the photographing scene may also be referred to as "framing". The framing process performed by the electronic device relates to parameters such as sensitivity, exposure time, and 3A parameters, and these parameters are referred to as framing parameters. Framing parameters corresponding to different photographing modes may be the same or different. For example, that framing parameters of two photographing modes are the same is: an ISO difference between the two photographing modes is less than a first threshold, an exposure time difference is less than a second threshold, and a 3A parameter difference is less than a third threshold. In this embodiment, if the framing parameters of the two photographing modes are the same, the electronic device may perform framing once, so that photographing resources can be saved.

In a possible design, the obtaining at least one image of the photographing scene in response to a first photographing instruction input by a first user includes: when the at least one target photographing mode is a portrait mode, sequentially selecting at least two photographed objects from the at least one photographed object in ascending order of distances; obtaining framed image data of the photographing scene by using the portrait mode; and processing the image data based on the portrait mode by using each of the at least two photographed objects as a photographed subject separately, to obtain at least two images of the photographing scene. In a multi-person photographing scene, the electronic device can obtain framed image data of the photographing scene by performing photographing once in the portrait mode. Further, the electronic device may perform processing such as background blurring, beautification, and resurfacing on the image data by using each target person as a photographed subject, to obtain an image with each target person as a photographed subject, thereby obtaining a plurality of images with different imaging effects. In this implementation, the electronic device may obtain a depth image and a color image of a portrait photographing scene by performing framing only once, and further achieve an imaging effect with each target person as a subject by performing different subsequent processing. In comparison with some implementations in a conventional technology in which every person is separately photographed as a subject, in this embodiment, there is no need to perform photographing for a plurality of times, and for the multi-person photographing scene, a subject person can be used as a center for beautification, noise reduction, background blurring, and the like based on a salience condition of the person, thereby achieving a better photographing effect.

In a possible design, the method further includes: invoking at least two cameras to perform photographing in the at least one target photographing mode. In some embodiments, the electronic device may include a plurality of cameras. Further, in this embodiment, when performing photographing in any photographing mode, the electronic device may invoke a plurality of cameras to perform combined photographing. In comparison with a scene in which one photographing mode is used and only one camera is invoked to perform photographing, a corresponding photographing mode can be adapted to a greatest extent, and advantages of each camera can be fully used, so that a photographing effect is better.

In a possible design, after the obtaining at least one image of the photographing scene, the method further includes: receiving a first preview instruction input by the first user; and displaying the at least one image in a stacking mode, where displaying in the stacking mode means that a first image in the at least one image is displayed over a second image in the at least one image and that the first image is completely displayed. In this implementation, the electronic device can display, to the user, a plurality of images obtained by performing photographing once, thereby improving user experience.

In a possible design, the method further includes: receiving a first dynamic display instruction input by the first user; controlling the at least one image to be cyclically displayed at a frontmost end on a display; receiving a first dynamic display stop instruction input by the first user; and controlling an image corresponding to the first dynamic display stop instruction to be statically displayed at the frontmost end. In this implementation, not only each image can be dynamically displayed, so that the user compares an effect of the at least one image, but also any image can be statically displayed, so that the user carefully views an effect of the image, thereby improving user experience.

In a possible design, the method further includes: receiving a second dynamic display instruction input by the first user; controlling the at least one image to be cyclically displayed at a frontmost end on a display; receiving a second dynamic display stop instruction input by the first user; and controlling an image corresponding to the second dynamic display stop instruction to be statically displayed at the frontmost end. In this implementation, not only each image can be dynamically displayed, so that the user compares an effect of the at least one image, but also any image can be statically displayed, so that the user carefully views an effect of the image, thereby improving user experience.

In a possible design, after the obtaining at least one image of the photographing scene, the method further includes: receiving a second preview instruction input by the first user; and displaying the at least one image in a stacking mode on a first screen, where displaying in the stacking mode means that a first image in the at least one image is displayed over a second image in the at least one image and that the first image is completely displayed on the first screen. In this implementation, the electronic device can display, to the user, a plurality of images obtained by performing photographing once, thereby improving user experience.

In a possible design, the method further includes: receiving a first gesture instruction input by the first user; and controlling an image corresponding to the first gesture instruction to be displayed on a second screen, and controlling an image under the image corresponding to the first gesture instruction to be displayed on the first screen. In this implementation, the electronic device can separately display different images on two screens by using a multi-screen feature, so that the user compares an effect of the at least one image, thereby improving user experience.

In a possible design, the method further includes: receiving a third dynamic display instruction input by the first user; controlling the at least one image to be displayed cyclically at a frontmost end on the first screen; receiving a second gesture instruction input by the first user; and controlling an image corresponding to the second gesture instruction to be displayed on a second screen. In this implementation, not only each image can be dynamically displayed, so that the user compares an effect of the at least one image, but also any image can be statically displayed, so that the user carefully views an effect of the image, thereby improving user experience.

In a possible design, the image displayed at the frontmost end of the display is marked with a photographing mode corresponding to the image. In this implementation, the electronic device can explicitly display, to the user, a photographing mode corresponding to any image, thereby improving user experience.

In a possible design, the method further includes: receiving a second photographing instruction input by the first user; and performing photographing in the photographing scene by using a photographing mode corresponding to the second photographing instruction. In this implementation, user experience can be improved.

In a possible design, before the determining feature information of each of at least one photographed object included in a photographing scene, the method further includes: receiving a first setting instruction input by the first user; displaying an image quantity setting entry in response to the first setting instruction; and receiving, by using the image quantity setting entry, a quantity of target images that are obtained by performing photographing and input by the first user, where a quantity of the at least one image is greater than or equal to the quantity of target images.

According to a second aspect, an embodiment of this application provides an electronic device. The electronic device has a function of implementing the foregoing method. The function may be implemented by hardware, or may be implemented by hardware executing corresponding software. The hardware or the software includes one or more modules corresponding to the foregoing function. In a possible design, a structure of the electronic device includes a processor, a receiver, and a display. The processor is configured to process the electronic device to perform a corresponding function in the foregoing method. The receiver is configured to receive various instructions input by a user. The display is configured to display an image. The electronic device may further include a memory. The memory is coupled to the processor, and configured to store program instructions and data that are necessary for the electronic device.

According to a third aspect, an embodiment of this application provides a computer storage medium. The computer storage medium stores instructions. When the instructions are run on a computer, the computer is enabled to perform some or all of the steps of the photographing method in the first aspect and each possible implementation of the first aspect.

According to a fourth aspect, an embodiment of this application provides a computer program product. When the computer program product is run on a computer, the computer is enabled to perform some or all of the steps of the photographing method in the first aspect and each possible implementation of the first aspect.

BRIEF DESCRIPTION OF DRAWINGS

FIG. 2A-2 is a schematic diagram of a GUI 32 according to an embodiment of this application;

FIG. 2A-3 is a schematic diagram of a GUI 33 according to an embodiment of this application;

FIG. 2A-4 is a schematic diagram of a GUI 34 according to an embodiment of this application;

FIG. 2A-5 is a schematic diagram of a GUI 35 according to an embodiment of this application;

FIG. 2B-1 is an example schematic diagram of a GUI 36 according to an embodiment of this application;

FIG. 2B-2 is another example schematic diagram of a GUI 36 according to an embodiment of this application;

FIG. 2B-3 is a schematic diagram of a GUI 36-1 according to an embodiment of this application;

FIG. 2B-4 is a schematic diagram of a GUI 36-2 according to an embodiment of this application;

FIG. 2B-5 is a schematic diagram of a GUI 37 according to an embodiment of this application;

FIG. 2B-6 is a schematic diagram of a GUI 37-1 according to an embodiment of this application;

FIG. 2B-7 is a schematic diagram of a GUI 38 according to an embodiment of this application;

FIG. 2C-1 is an example schematic diagram of a GUI 41 according to an embodiment of this application;

FIG. 2C-2 is another example schematic diagram of a GUI 42 according to an embodiment of this application;

FIG. 2C-3 is a schematic diagram of a GUI 43 according to an embodiment of this application;

FIG. 2C-4 is a schematic diagram of a GUI 44 according to an embodiment of this application;

FIG. 3 is a method flowchart of a photographing method 10 according to an embodiment of this application;

FIG. 4A-1 is a schematic diagram of displaying when an electronic device processes the photographing scene 300-1 shown in FIG. 4A according to an embodiment of this application;

FIG. 4B-1 is a schematic diagram of displaying when an electronic device processes the photographing scene 300-2 shown in FIG. 4B according to an embodiment of this application;

DESCRIPTION OF EMBODIMENTS

Figure 1A:
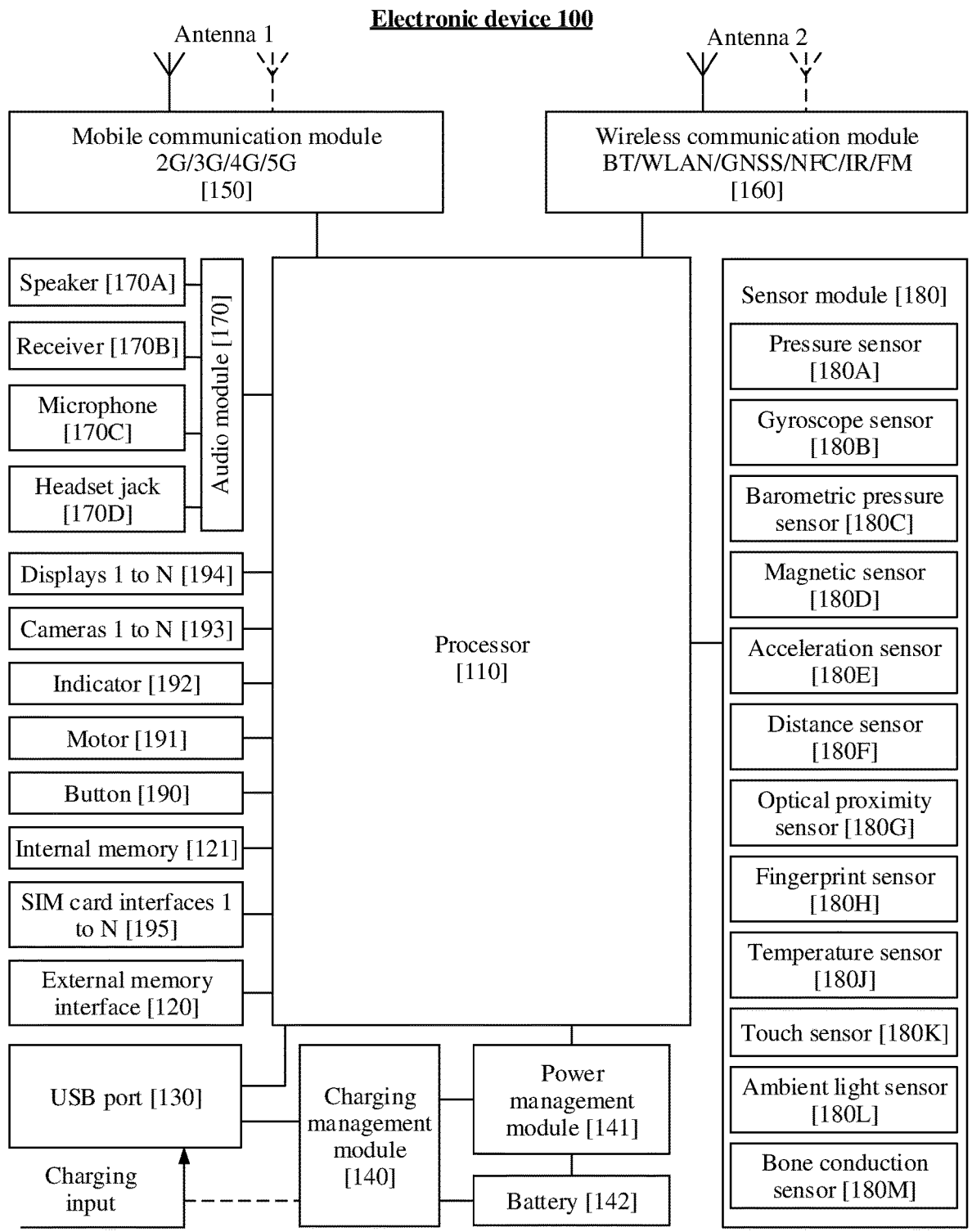
FIG. 1A is a schematic diagram of an example hardware structure of an electronic device 100 according to an embodiment of this application.

The following clearly describes technical solutions in embodiments of this application with reference to the accompanying drawings in embodiments of this application.

Terms used in the following embodiments of this application are merely intended to describe particular embodiments, but are not intended to limit this application. Terms "one", "a", "the", "the foregoing", "this", and "the one" of singular forms used in this specification and the appended claims of this application are also intended to include plural forms, unless otherwise specified in the context clearly.

The following embodiments describe an electronic device and embodiments of a photographing method applied to the electronic device.

The electronic device in embodiments of this application may be an electronic device including a camera, for example, an electronic device such as a mobile phone, a tablet computer, a wearable device (for example, a watch, a hand ring, a helmet, or a headset), an in-vehicle device, an augmented reality (AR)/virtual reality (VR) device, a notebook computer, an ultra-mobile personal computer (UMPC), a netbook, a personal digital assistant (PDA), or a smart home device (for example, a smart TV, a smart speaker, or a smart camera). It may be understood that a specific type of the electronic device is not limited in embodiments of this application. The electronic device may be a device on which iOS®, Android®, Microsoft®, or another operating system is installed. In a possible implementation, the camera may be a rear-facing camera of the electronic device. In another possible implementation, the camera may be a front-facing camera of the electronic device. A location of the camera is not limited in embodiments of this application.

A "user interface (UI)" used to display an image in embodiments of this application is a medium interface for interaction and information exchange between an application or an operating system and a user. The user interface implements conversion between an internal form of information and a form acceptable to the user. The user interface of the application is source code complied by using a specific computer language such as Java or an extensible markup language (XML). The source code of the interface is parsed and rendered on a terminal device, and finally displayed as content that can be recognized by the user, such as a video, a picture, a text, a button, or other controls. A control, also known as a widget, is a basic element of the user interface. Typical controls include a toolbar, a menu bar, a text box, a button, a scrollbar, a picture, and a text. Properties and content of controls in the interface are defined by using tags or nodes. For example, XML uses nodes such as <Textview>, <ImgView>, and <VideoView> to specify the controls included in the interface. A node corresponds to a control or a property in the interface. After being parsed and rendered, the node is displayed as content visible to the user. In addition, in many applications such as hybrid applications, an interface usually further includes a web page. A web page, also known as a page, may be understood as a special control embedded in an application interface. The web page is source code compiled by using a specific computer language, such as a hypertext markup language (HTML), cascading style sheets (CSS), or Java script (JS). The source code of the web page can be loaded and displayed as user-recognizable content by a browser or a web display component that is functionally similar to a browser. Specific content included in the web page is also defined by using tags or nodes in the source code of the web page. For example, HTML uses <p>, <img>, <video>, and <canvas> to define elements and properties of a web page.

The user interface is usually represented in a form of a graphical user interface (GUI), which is a user interface displayed in a graphical mode and related to a computer operation. A graphical user interface may be an icon, a window, a control, or other interface elements displayed on a display of the electronic device. The control may include a visual interface element such as an icon, a button, a menu, a tab, a text box, a dialog box, a status bar, a navigation bar, or a widget.

A "photographing mode" in embodiments of this application is a mode in which the electronic device uses different photographing parameters in different photographing modes from obtaining image data of a photographing scene to final imaging, so that different imaging effects can be obtained optionally by performing photographing in the same photographing scene in different photographing modes. Further, in actual use, different photographing modes are applicable to photographing of different photographing scenes. For example, a high dynamic range image (HDR) mode is applicable to photographing of scenery, and a portrait mode is applicable to photographing of a person.

Embodiments of this application provide a photographing method and an electronic device. The electronic device includes a camera, and the electronic device supports at least two photographing modes. After receiving one photographing instruction, the electronic device can obtain a plurality of images with different imaging effects in a photographing scene, thereby achieving high intelligence and improving user experience.

The following describes an example electronic device 100 provided in an embodiment of this application.

FIG. 1A is a schematic diagram of a hardware structure of the electronic device 100.

The electronic device 100 may include a processor 110, an external memory interface 120, an internal memory 121, a universal serial bus (USB) port 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment constitutes no specific limitation on the electronic device 100. In some other embodiments of this application, the electronic device 100 may include more or fewer components than those shown in the figure, or some components may be combined, or some components may be split, or there may be a different component layout. The components shown in the figure may be implemented by using hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent devices, or may be integrated into one or more processors. In some embodiments, the electronic device 100 may alternatively include one or more processors 110.

The controller may be a nerve center and a command center of the electronic device 100. The controller may generate an operation control signal based on instruction operation code and a timing signal, and implement control over a detection instruction.

A memory may be further disposed in the processor 110, and is configured to store instructions and data. In some embodiments, the memory in the processor 110 is a cache. The memory may store an instruction or data that has been used or is cyclically used by the processor 110. If the processor 110 needs to use the instruction or the data again, the processor may directly invoke the instruction or the data from the memory. Therefore, repeated access is avoided, a waiting time of the processor 110 is reduced, and efficiency of the electronic device 100 is improved.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identification module (SIM) interface, a universal serial bus (USB) port, and/or the like.

The I2C interface is a two-way synchronization serial bus, and includes one serial data line (SDA) and one serial clock line (SCL). In some embodiments, the processor 110 may include a plurality of groups of I2C buses. The processor 110 may be separately coupled to the touch sensor 180K, a charger, a flashlight, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be used for audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call by using a Bluetooth headset.

The PCM interface may also be configured to perform audio communication, and sample, quantize, and code an analog signal. In some embodiments, the audio module 170 may be coupled to the wireless communication module 160 through a PCM bus interface. In some embodiments, the audio module 170 may alternatively transmit an audio signal to the wireless communication module 160 through the PCM interface, to implement a function of answering a call through a Bluetooth headset. Both the I2S interface and the PCM interface may be used for audio communication.

The UART interface is a universal serial data bus, and is used for asynchronous communication. The bus may be a two-way communication bus. The bus converts to-be-transmitted data between serial communication and parallel communication. In some embodiments, the UART interface is usually used to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music by using a Bluetooth headset.

The MIPI interface may be configured to connect the processor 110 to a peripheral component such as the display 194 or the camera 193. The MIPI interface includes a camera serial interface (CSI), a display serial interface (DSI), and the like. In some embodiments, the processor 110 communicates with the camera 193 through the CSI, to implement a photographing function of the electronic device 100. The processor 110 communicates with the display 194 through the DSI, to implement a display function of the electronic device 100.

The GPIO interface may be configured by using software. The GPIO interface may be configured as a control signal, or may be configured as a data signal. In some embodiments, the GPIO interface may be configured to connect the processor 110 to the camera 193, the display 194, the wireless communication module 160, the audio module 170, the sensor module 180, or the like. The GPIO interface may be further configured as the I2C interface, the I2S interface, the UART interface, the MIPI interface, or the like.

The USB port 130 is a port that conforms to a USB standard specification, and may be specifically a mini USB port, a micro USB port, a USB Type C port, or the like. The USB port 130 may be configured to connect to a charger to charge the electronic device 100, or may be configured to transmit data between the electronic device 100 and a peripheral device, or may be configured to connect to a headset, to play audio by using the headset. The port may be further configured to connect to another electronic device such as an AR device.

It may be understood that an interface connection relationship between the modules shown in this embodiment is merely an example for description, and constitutes no limitation on the structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from a charger. The charger may be a wireless charger or a wired charger. In some embodiments of wired charging, the charging management module 140 may receive a charging input from a wired charger through the USB port 130. In some embodiments of wireless charging, the charging management module 140 may receive a wireless charging input through a wireless charging coil of the electronic device 100. The charging management module 140 may further supply power to the electronic device by using the power management module 141 while charging the battery 142.

The power management module 141 is configured to connect to the battery 142, the charging management module 140, and the processor 110. The power management module 141 receives an input of the battery 142 and/or the charging management module 140, and supplies power to the processor 110, the internal memory 121, an external memory, the display 194, the camera 193, the wireless communication module 160, and the like. The power management module 141 may be configured to monitor parameters such as a battery capacity, a battery cycle count, and a battery health status (electric leakage and impedance). In some other embodiments, the power management module 141 may alternatively be disposed in the processor 110. In some other embodiments, the power management module 141 and the charging management module 140 may alternatively be disposed in a same component.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be further multiplexed, to improve antenna utilization. For example, the antenna 1 may be multiplexed as a diversity antenna in a wireless local area network. In some other embodiments, an antenna may be used in combination with a tuning switch.

The mobile communication module 150 may provide a wireless communication solution applied to the electronic device 100 and including 2G/3G/4G/5G or the like. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules of the mobile communication module 150 may be disposed in the processor 110. In some embodiments, at least some functional modules of the mobile communication module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transfers an obtained signal to the application processor. The application processor outputs a sound signal by using an audio device (which is not limited to the speaker 170A, the receiver 170B, and the like), or displays an image or a video on the display 194. In some embodiments, the modem processor may be an independent component. In some other embodiments, the modem processor may be independent of the processor 110, and is disposed in the same device as the mobile communication module 150 or another functional module.

The wireless communication module 160 may provide a wireless communication solution that is applied to the electronic device 100, and that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like. The wireless communication module 160 may be one or more components integrating at least one communication processor module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communication module 150 in the electronic device 100 are coupled, and the antenna 2 and the wireless communication module 160 in the electronic device 100 are coupled, so that the electronic device 100 can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or satellite based augmentation systems (SBAS).

In some embodiments, a wireless communication solution provided by the mobile communication module 150 may enable the electronic device to communicate with a device (such as a cloud server) in a network, and a WLAN wireless communication solution provided by the wireless communication module 160 may also enable the electronic device to communicate with a device (such as a cloud server) in a network. In this way, the electronic device can perform data transmission with the cloud server.

The electronic device 100 may implement a display function by using the display 194, the application processor, and the like. The display 194 is configured to display a control, information, a video, an image, and the like. For example, the display 194 may display a camera control, and the camera control is used to receive an instruction of a user to start a photographing function of the camera 193. The display 194 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like.

The electronic device 100 can implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scene. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (CCD) or a complementary metal-oxide-semiconductor (CMOS) photoelectric transistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format, for example, RGB or YUV.

The digital signal processor is configured to process a digital signal, and may process another digital signal in addition to the digital image signal. For example, when the electronic device 100 selects a frequency, the digital signal processor is configured to perform Fourier transform on frequency energy.

The video codec is configured to compress or decompress a digital video. The electronic device 100 may support one or more types of video codecs. Therefore, the electronic device 100 may play or record videos in a plurality of coding formats, for example, moving picture experts group (MPEG)-1, MPEG-2, MPEG-3, and MPEG-4.

The NPU is a neural-network (NN) computing processor. The NPU quickly processes input information with reference to a structure of a biological neural network, for example, a transfer mode between human brain neurons, and may further continuously perform self-learning. Applications such as intelligent cognition of the electronic device 100, for example, image recognition, facial recognition, speech recognition, and text understanding, may be implemented through the NPU.

The external memory interface 120 may be used to connect to an external storage card, for example, a micro SD card, to extend a storage capability of the electronic device 100. The external storage card communicates with the processor 110 through the external memory interface 120, to implement a data storage function. For example, data such as music, photos, and videos is stored in the external storage card.

The internal memory 121 may be configured to store one or more computer programs, and the one or more computer programs include instructions. The processor 110 may run the instructions stored in the internal memory 121, so that the electronic device 100 performs a video shooting method provided in some embodiments of this application, and various applications, data processing, and the like. The internal memory 121 may include a program storage area and a data storage area. The program storage area may store an operating system. The program storage area may further store one or more applications (for example, gallery and contacts) and the like. The data storage area may store data created during use of the electronic device 100. In addition, the internal memory 121 may include a high-speed random access memory, and may further include a nonvolatile memory, for example, at least one magnetic disk storage device, a flash memory device, or a universal flash storage (UFS).

The electronic device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may be further configured to code and decode an audio signal. In some embodiments, the audio module 170 may be disposed in the processor 110, or some functional modules of the audio module 170 are disposed in the processor 110.

The speaker 170A, also referred to as a "loudspeaker", is configured to convert an audio electrical signal into a sound signal. The electronic device 100 may listen to music or answer a hands-free call by using the speaker 170A.

The receiver 170B, also referred to as an "earpiece", is configured to convert an electrical audio signal into a sound signal. When a call is answered or audio information is listened to by using the electronic device 100, the receiver 170B may be put close to a human ear to listen to a voice.

The microphone 170C, also referred to as a "mike" or a "mic", is configured to convert a sound signal into an electrical signal. When making a call or sending speech information, a user may place the mouth of the user near the microphone 170C to make a sound, to input a sound signal to the microphone 170C. At least one microphone 170C may be disposed in the electronic device 100. In some other embodiments, two microphones 170C may be disposed in the electronic device 100, to collect a sound signal and further implement a noise reduction function. In some other embodiments, three, four, or more microphones 170C may alternatively be disposed in the electronic device 100, to collect a sound signal, implement noise reduction, and identify a sound source, to implement a directional recording function and the like.

The headset jack 170D is configured to connect to a wired headset. The headset jack 170D may be the USB port 130, or may be a 3.5 mm open mobile terminal platform (OMTP) standard interface or a Cellular Telecommunications Industry Association of the USA (CTIA) standard interface.

The pressure sensor 180A is configured to sense a pressure signal, and can convert the pressure signal into an electrical signal. In some embodiments, the pressure sensor 180A may be disposed on the display 194. There is a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on a capacitance change. When a touch operation is performed on the display 194, the electronic device 100 detects intensity of the touch operation through the pressure sensor 180A. The electronic device 100 may also calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on an SMS message application icon, an instruction for viewing an SMS message is executed. When a touch operation whose touch operation intensity is greater than or equal to the first pressure threshold is performed on the Messages icon, an instruction for creating a new SMS message is executed.

The gyroscope sensor 180B may be configured to determine a motion posture of the electronic device 100. In some embodiments, an angular velocity of the electronic device 100 around three axes (that is, axes x, y, and z) may be determined by using the gyro sensor 180B. The gyroscope sensor 180B may be configured to implement image stabilization during photographing. For example, when the shutter is pressed, the gyroscope sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyroscope sensor 180B may be further used in a navigation scenario and a motion-sensing game scenario.

The barometric pressure sensor 180C is configured to measure barometric pressure. In some embodiments, the electronic device 100 calculates an altitude based on a value of the barometric pressure measured by the barometric pressure sensor 180C, to assist in positioning and navigation.

The magnetic sensor 180D includes a Hall effect sensor. The electronic device 100 may detect opening and closing of a flip cover by using the magnetic sensor 180D. In some embodiments, when the electronic device 100 is a clamshell phone, the electronic device 100 may detect opening and closing of a flip cover based on the magnetic sensor 180D. Further, a feature such as automatic unlocking upon opening of the flip cover is set based on a detected opening or closing state of the flip cover.

The acceleration sensor 180E may detect accelerations in various directions (usually on three axes) of the electronic device 100. When the electronic device 100 is still, a magnitude and a direction of gravity may be detected. The acceleration sensor 180E may be further configured to identify a posture of the electronic device, and is used in an application such as switching between landscape mode and portrait mode or a pedometer.

The distance sensor 180F is configured to measure a distance. The electronic device 100 may measure a distance in an infrared manner or a laser manner. In some embodiments, in a photographing scene, the electronic device 100 may measure a distance by using the distance sensor 180F, to implement quick focusing.

The optical proximity sensor 180G may include a light-emitting diode (LED) and an optical detector, for example, a photodiode. The light-emitting diode may be an infrared light-emitting diode. The electronic device 100 emits infrared light by using the light-emitting diode. The electronic device 100 detects infrared reflected light from a nearby object by using the photodiode. When sufficient reflected light is detected, the electronic device 100 may determine that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically turn off a screen for power saving. The optical proximity sensor 180G may also be used in a flip cover mode or a pocket mode to automatically unlock or lock the screen.

The ambient light sensor 180L is configured to sense ambient light brightness. The electronic device 100 may adaptively adjust brightness of the display 194 based on the sensed ambient light brightness. The ambient light sensor 180L may also be configured to automatically adjust a white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 lowers performance of a processor near the temperature sensor 180J, to reduce power consumption and implement thermal protection. In some other embodiments, when the temperature is less than another threshold, the electronic device 100 heats the battery 142 to prevent the electronic device 100 from being shut down abnormally due to a low temperature. In some other embodiments, when the temperature is less than still another threshold, the electronic device 100 boosts an output voltage of the battery 142 to avoid abnormal shutdown due to a low temperature.

The touch sensor 180K may also be known as a touch panel or a touch-sensitive surface. The touch sensor 180K may be disposed on the display 194, and the touch sensor 180K and the display 194 form a touchscreen. The touch sensor 180K is configured to detect a touch operation performed on or near the touch sensor. The touch sensor may transfer the detected touch operation to the application processor to determine a type of a touch event. A visual output related to the touch operation may be provided through the display 194. In some other embodiments, the touch sensor 180K may alternatively be disposed on a surface of the electronic device 100 at a location different from a location of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse, and receive a blood pressure beating signal. In some embodiments, the bone conduction sensor 180M may alternatively be disposed in the headset, to constitute a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a key input, and generate a key signal input related to user settings and function control of the electronic device 100.

The motor 191 may generate a vibration prompt. The motor 191 may be configured to produce an incoming call vibration prompt and a touch vibration feedback. For example, touch operations performed on different applications (for example, photographing and audio playing) may correspond to different vibration feedback effects. For touch operations performed on different areas of the display 194, the motor 191 may also correspond to different vibration feedback effects. Different application scenarios (for example, time reminding, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type or of different types. The SIM card interface 195 is compatible with different types of SIM cards. The SIM card interface 195 is also compatible with an external storage card. The electronic device 100 interacts with a network through the SIM card, to implement functions such as calling and data communication. In some embodiments, the electronic device 100 uses an eSIM, that is, an embedded SIM card. The eSIM card may be embedded into the electronic device 100, and cannot be separated from the electronic device 100.

By using the camera 193, the example electronic device 100 shown in FIG. 1A can implement the photographing function described in the following embodiments. By using the display 194, the electronic device 100 can display each image described in the following embodiments, and the like.

A software system of the electronic device 100 may use a layered architecture, an event-driven architecture, a microkernel architecture, a micro service architecture, or a cloud architecture. In this embodiment, an Android system of a layered architecture is used as an example to describe the software structure of the electronic device 100.

Figure 1B:
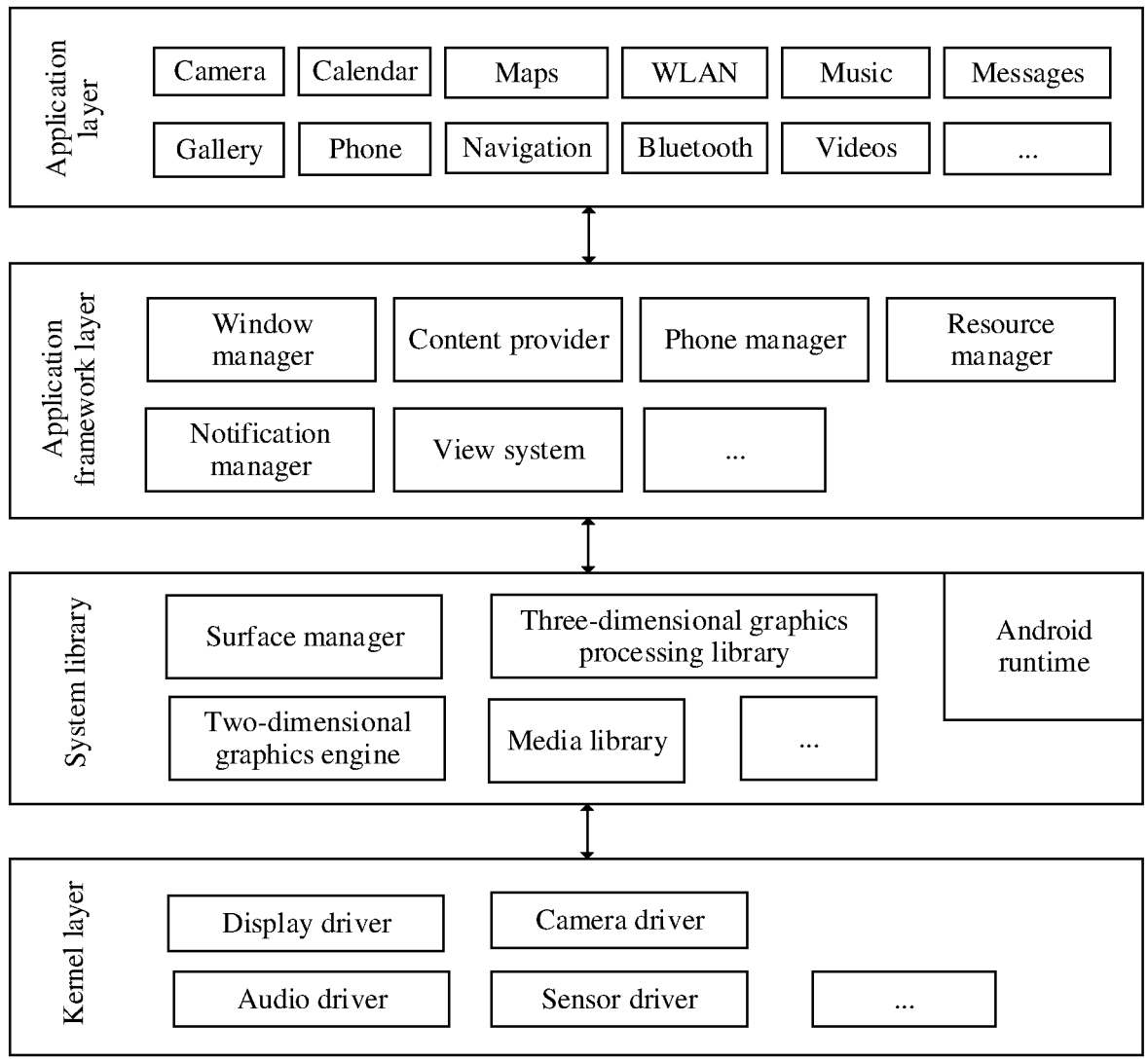
FIG. 1B is a schematic diagram of an example software architecture of an electronic device 100 according to an embodiment of this application.

FIG. 1B is a schematic diagram of the software structure of the electronic device 100 according to this embodiment.

In a layered architecture, software is divided into several layers, and each layer has a clear role and task. The layers communicate with each other through a software interface. In some embodiments, the Android system is divided into four layers: an application layer, an application framework layer, an Android runtime and system library, and a kernel layer from top to bottom.

The application layer may include a series of application packages.

As shown in FIG. 1B, the application packages may include applications such as camera, gallery, phone, navigation, Bluetooth, music, video, and messages.

The application framework layer provides an application programming interface (API) and a programming framework for an application at the application layer. The application framework layer includes some predefined functions.

As shown in FIG. 1B, the application framework layer may include a window manager, a content provider, a view system, a phone manager, a resource manager, a notification manager, and the like.

The window manager is configured to manage a window program. The window manager may obtain a display size, obtain parameters of each display area in a display interface, and the like.

The content provider is configured to store and obtain data, and enable the data to be accessed by an application. The data may include a video, an image, audio, calls that are made and received, a browsing history and bookmarks, a phone book, and the like.

The view system includes visual controls, such as a control for displaying a text and a control for displaying an image. The view system may be configured to construct an application. A display interface may include one or more views, for example, include a display interface of a camera icon.

The phone manager is configured to provide a communication function of the electronic device 100, for example, management of a call status (including answering, declining, or the like).

The resource manager provides, for an application, various resources such as a localized character string, an icon, a picture, a layout file, and a video file.

The notification manager enables an application to display notification information in the status bar, and may be configured to transmit a notification-type message. The displayed information may automatically disappear after a short pause without user interaction. For example, the notification manager is configured to notify download completion, provide a message notification, and the like. The notification manager may alternatively be a notification that appears in a top status bar of the system in a form of a graph or a scroll bar text, for example, a notification of an application running on the background or a notification that appears on a screen in a form of a dialog window. For example, text information is displayed in the status bar, an announcement is given, the electronic device vibrates, or the indicator light blinks.

The Android runtime includes a kernel library and a virtual machine. The Android runtime is responsible for scheduling and management of the Android system.

The kernel library includes two parts: a function that needs to be called in Java language, and a kernel library of Android.

The application layer and the application framework layer run on a virtual machine. The virtual machine executes Java files at the application layer and the application framework layer as binary files. The virtual machine is configured to perform functions such as object lifecycle management, stack management, thread management, security and exception management, and garbage collection.

The system library may include a plurality of functional modules, for example, a surface manager, a media library, a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playing and recording of a plurality of commonly used audio and video formats, static image files, and the like. The media library may support a plurality of audio and video coding formats, for example, MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The software system shown in FIG. 1B involves a program (such as the kernel library) invoking the camera, an application module (such as the window manager) providing a displayed image, an application framework, the display driver, and the like.

The following describes, from a perspective of man-machine interaction, a display effect of the electronic device in this embodiment by using an example with reference to a GUI of the electronic device. The GUI may be displayed on the display 194 of the electronic device 100.

For example, a smartphone is used as an example. The smartphone includes a camera, and the camera is, for example, a rear-facing camera. A camera application (APP) is installed on the smartphone.

Before performing photographing, the smartphone may receive a setting instruction of the user, to obtain a plurality of images with different imaging effects by using at least one photographing mode in a photographing process.

Figures 1, 2A:
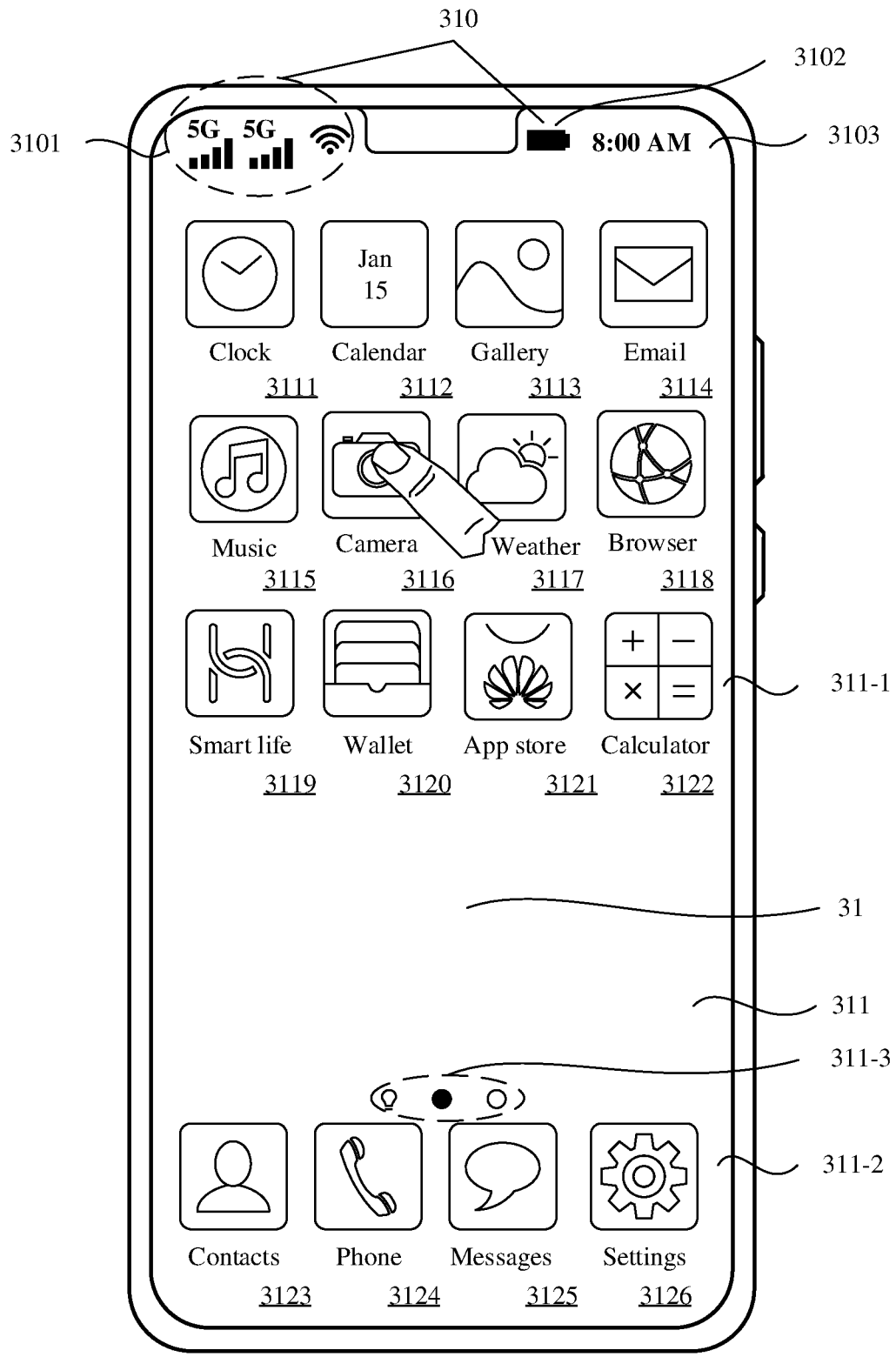
FIG. 2A-1 is a schematic diagram of a GUI 31 according to an embodiment of this application.

As shown in FIG. 2A-1, a GUI 31 of the smartphone includes a status bar 310 and a desktop 311, where the status bar 310 includes display icons of a network connection status 3101, power 3102, and time 3103 of the smartphone. The desktop 311 includes a switchable APP icon group 311-1 and a fixedly displayed APP icon group 311-2. The switchable APP icon group 311-1 in the GUI 31 includes icon elements of APPs such as clock 3111, calendar 3112, gallery 3113, email 3114, music 3115, camera 3116, weather 3117, browser 3118, smart life 3119, wallet 3120, application store 3121, and calculator 3122. The fixedly displayed APP icon group 311-2 may include icon elements of contacts 3123, phone 3124, messages 3125, and settings 3126. An interface indication icon 311-3 is further included between the switchable APP icon group 311-1 and the fixedly displayed APP icon group 311-2, and the interface indication icon 311-3 is used to indicate a sequence of the current switchable APP icon group in all switchable APP icon groups. When receiving a left-sliding or right-sliding gesture instruction input by the user on the GUI 31, the smartphone may switch an APP icon element displayed in the switchable APP icon group 311-1. In addition, the smartphone correspondingly changes an indication of the interface indication icon 311-3 based on a corresponding sequence of the switchable APP icon group after switching. Details are described herein.

Further, the camera 3116 displayed on the GUI 31 is an interface icon corresponding to the camera APP. After receiving an operation instruction input by the user by tapping the camera 3116, the smartphone runs the camera APP. Correspondingly, the GUI 31 is updated to a GUI 32 shown in FIG. 2A-2.

Figures 2, 2A:
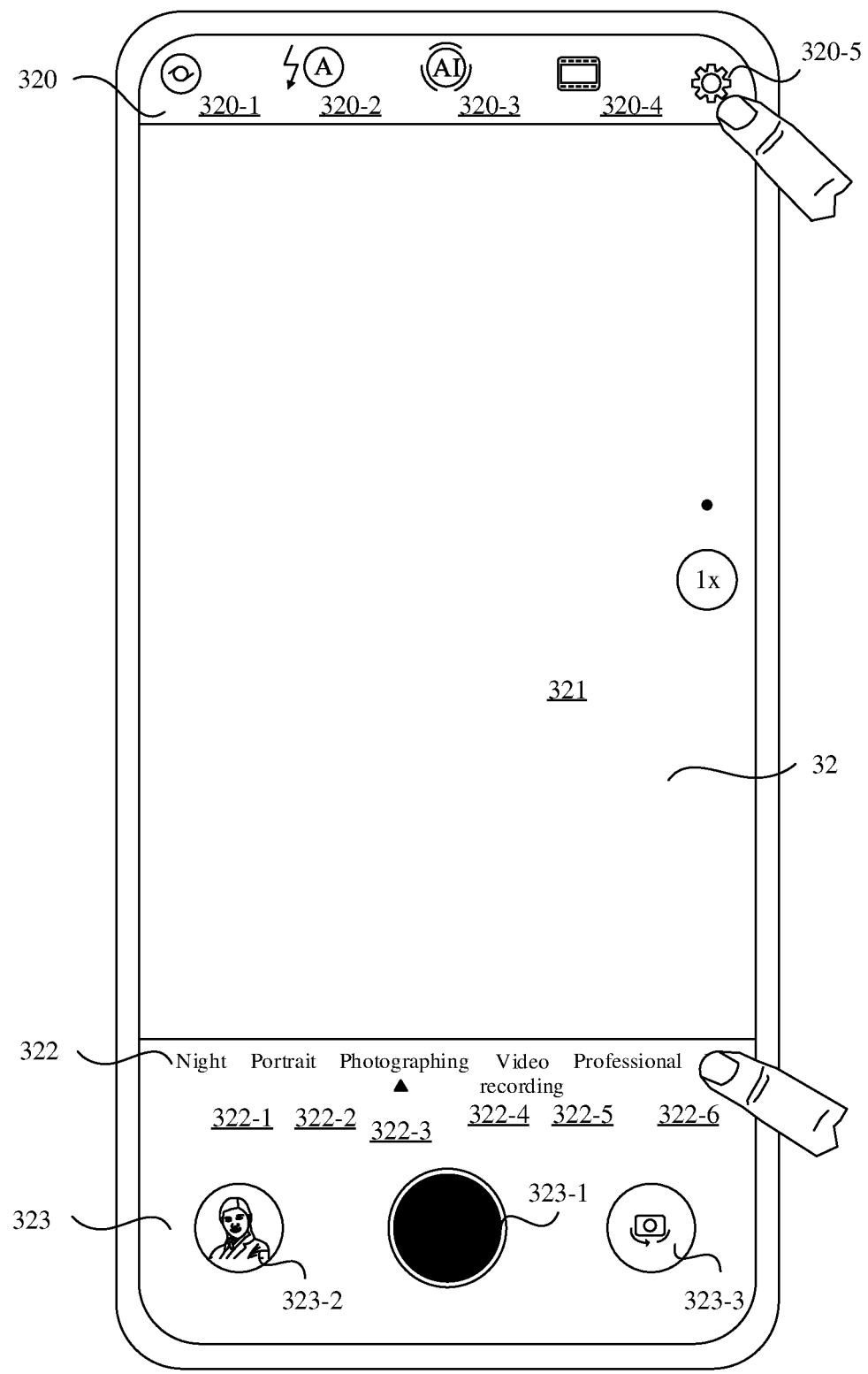

As shown in FIG. 2A-2, a photographing interface illustrated by the GUI 32 includes, for example, areas such as a first function setting bar 320, a viewfinder window 321, a second function setting bar 322, and a photographing function bar 323. The viewfinder window 321 is used to display an obtained photographed object to the user.

The first function setting bar 320 includes control elements such as an intelligent object identification control 320-1, a flashlight control 320-2, an AI photographing control 320-3, an image effect control 320-4, and a settings control 320-5. The intelligent object identification control 320-1 is used to identify a photographed object, for example, a type of a flower or a name of a building, and display an identification result to the user. The flashlight control 320-2 may be used to control turn-on and turn-off of the flashlight, to supplement light for the photographed object in the photographing process of the smartphone. The AI photographing control 320-3 is used to recognize a photographing scene, and further, the smartphone selects one or more photographing modes based on a recognition result and the technical solution provided in this embodiment. The settings control 320-5 is used to provide the user with more camera function settings. For example, the smartphone receives a first setting instruction input by the user by tapping the settings control 320-5, and the smartphone displays a photographing setting item, where the photographing setting item includes an image quantity setting entry. Correspondingly, the GUI 32 is updated to a GUI 34.

The second function setting bar 322 includes option targets of photographing modes such as a night mode 322-1, a portrait mode 322-2, a photographing mode 322-3, a video recording mode 322-4, a professional mode 322-5, and more modes 322-6. The night mode 322-1, the portrait mode 322-2, the photographing mode 322-3, the video recording mode 322-4, and the professional mode 322-5 correspond to photographing modes supported by the smartphone. After the smartphone performs photographing by using different photographing modes, videos or images having imaging effects corresponding to the photographing modes are displayed. For example, an image obtained by the smartphone by performing photographing in a photographing mode corresponding to the night mode 322-1 is an image obtained by performing photographing based on an exposure parameter or the like in photographing of a night scene. An image obtained by the smartphone by performing photographing in a photographing mode corresponding to the portrait mode 322-2 is an image obtained after processing such as resurfacing and blurring is performed on a photographing scene. An image obtained by the smartphone by performing photographing in a photographing mode corresponding to the photographing mode 322-3 is an image obtained by the smartphone by performing photographing based on a conventional photographing parameter. The smartphone can obtain, by performing photographing in a photographing mode corresponding to the video recording mode 322-4, a video corresponding to the photographing scene. In a photographing mode corresponding to the professional mode 322-5, the smartphone can provide the user with an entry for setting photographing parameters such as sensitivity, shutter speed, exposure value, automatic focus, and white balance, so that the user performs professional photographing settings, and further, an image is obtained by performing photographing based on the photographing parameters set by the user. The more modes 322-6 are used to provide the user with options of other photographing modes. For example, after receiving an instruction for displaying more photographing modes that is input by the user by triggering the more modes 322-6, the smartphone may display a menu including options of more photographing modes. Correspondingly, the GUI 32 is updated to a GUI 33.

The photographing function bar 323 includes control elements such as a trigger button 323-1, photo preview 323-2, and field-of-view switching 323-3. The trigger button 323-1 is used to enable the user to trigger the smartphone to perform a photographing operation. The photo preview 323-2 is used to enable the user to tap to preview an image that has been shot. The field-of-view switching 323-3 is used to enable the user to trigger the smartphone to switch a field of view of the camera displayed in a viewfinder frame. For example, if the field of view displayed in the current viewfinder frame is a field of view of the rear-facing camera of the smartphone, after receiving a first field-of-view switching instruction input by the user by tapping the field-of-view switching 323-3, the smartphone controls the field of view displayed in the viewfinder frame to switch to a field of view of a front-facing camera. If the field of view displayed in the current viewfinder frame is the field of view of the front-facing camera of the smartphone, after receiving a second field-of-view switching instruction input by the user by tapping the field-of-view switching 323-3, the smartphone controls the field of view displayed in the viewfinder frame to switch to the field of view of the rear-facing camera.

Figures 2, 2A, 3:
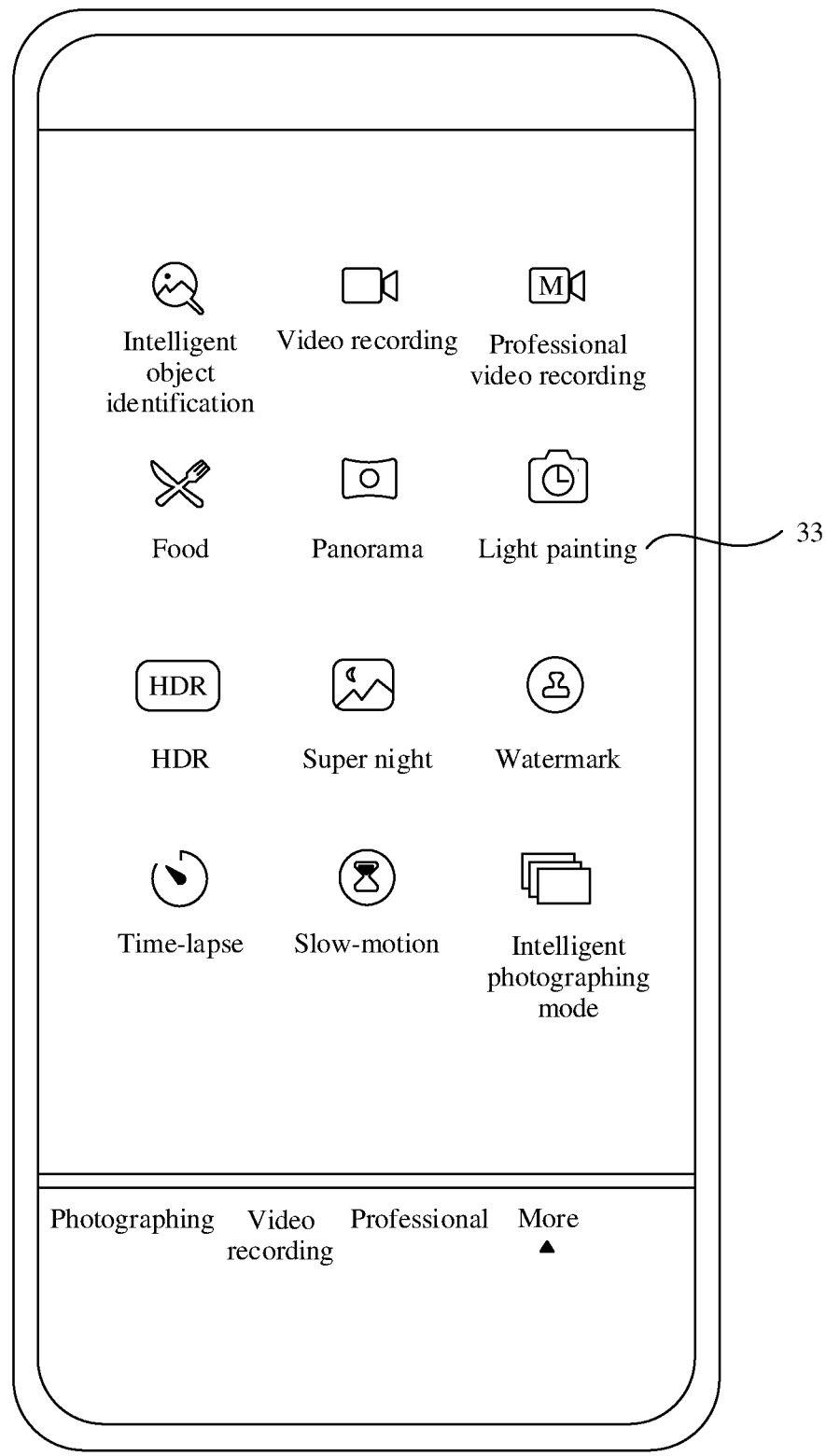
Figures 2, 2A, 3, 4:
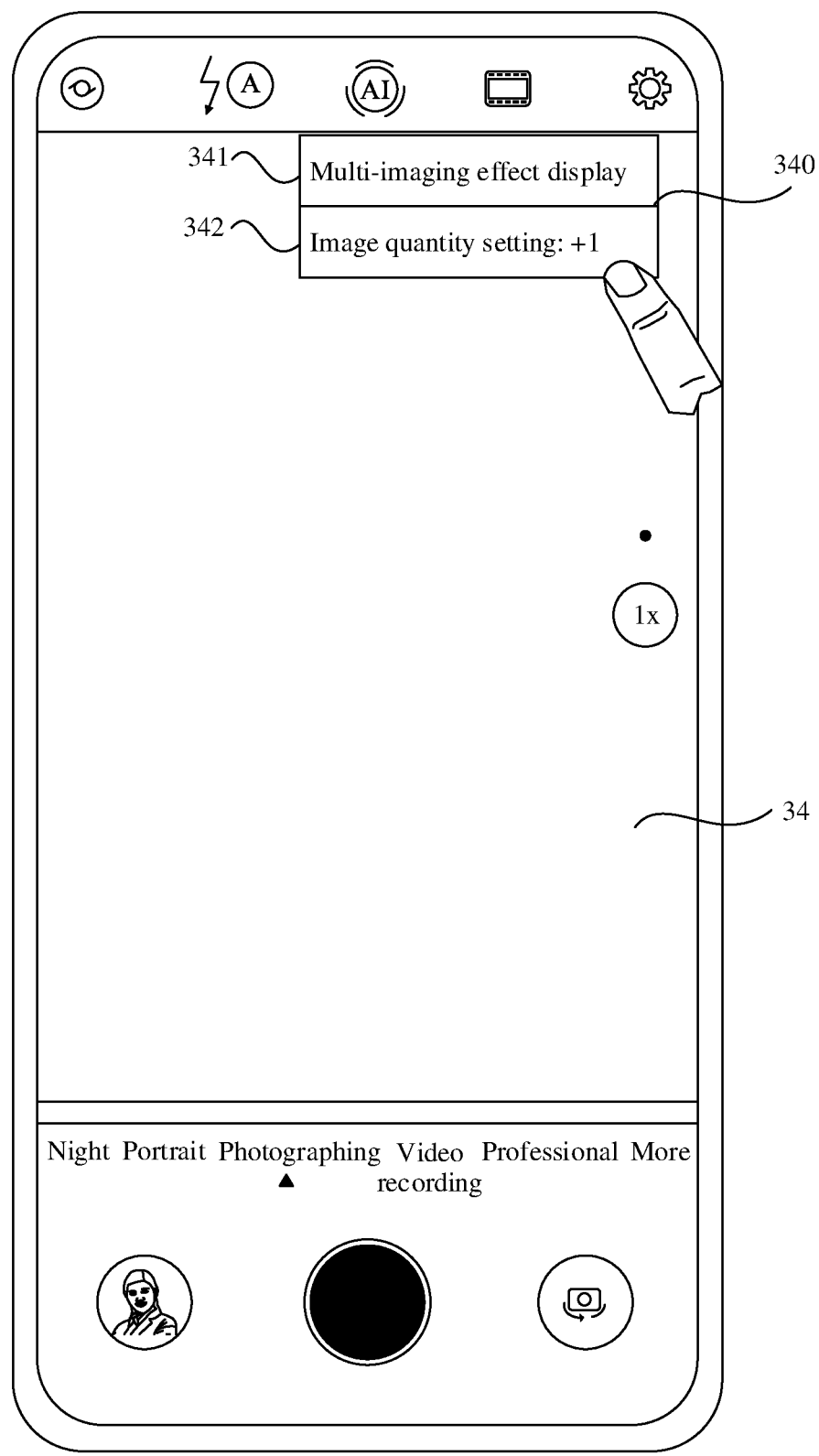
Figures 2, 2A, 3, 4, 5:
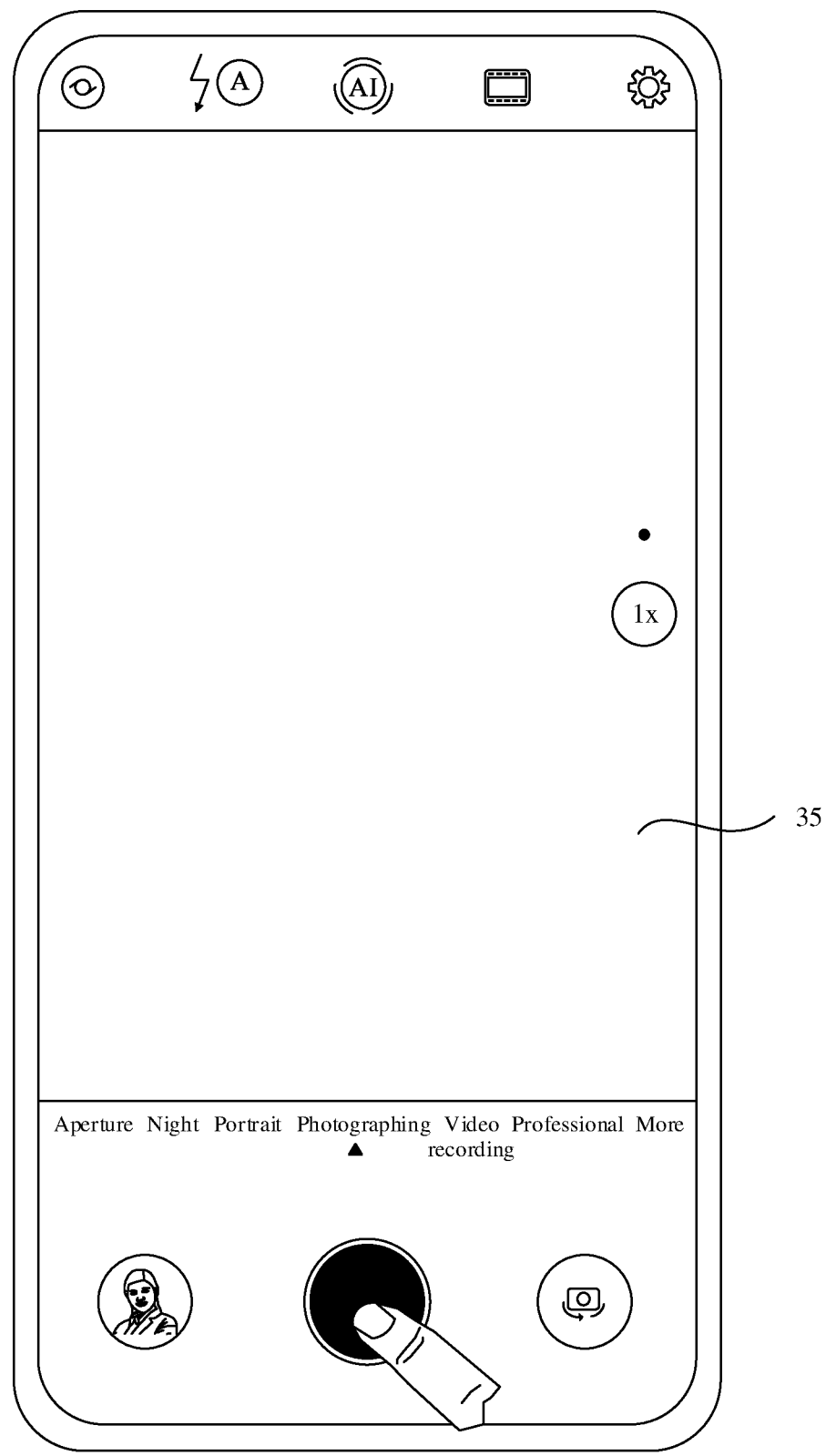

As shown in FIG. 2A-3, an interface illustrated by the GUI 33 includes icon elements such as intelligent object identification, video recording, professional video recording, food, panorama, and light painting, and optionally further includes an intelligent photographing mode corresponding to this embodiment. Details are not listed in this embodiment. For details, refer to FIG. 2A-3. Each icon element in the GUI 33 corresponds to a photographing mode supported by the smartphone. After receiving an instruction for performing photographing in any photographing mode, the smartphone shoots and displays a video or an image having an imaging effect corresponding to the corresponding photographing mode. Details are not described herein again.

In some embodiments, the user may select a photographing mode in a scene illustrated by the GUI 32 or in a scene illustrated by the GUI 33. For example, the user may tap the icon of the portrait mode 322-2 in a scene illustrated by the GUI 32. Correspondingly, after receiving an instruction corresponding to the user's tapping operation, the smartphone determines the portrait photographing mode corresponding to the instruction. In this embodiment, a selection mark is added below the icon of the portrait mode 322-2 illustrated by the GUI 32, to display to the user that the icon of the portrait mode 322-2 is selected. The selection mark is, for example, a triangular arrow. In some other embodiments, a corresponding text identifier is generated in the viewfinder window 321 for the selected mode, and the text identifier may be displayed in a floating mode to indicate a current photographing mode.

As shown in FIG. 2A-4, in the interface illustrated by the GUI 34, an accessory of the settings control 320-5 includes a drop-down menu 340, where the drop-down menu includes an option 341 and an option 342. Content of the option 341 is, for example, "multi-imaging effect display". Content of the option 342 is, for example, "image quantity setting: +1". For example, before the option "multi-imaging effect display" is selected, for example, the option is displayed as gray or dark, and correspondingly, the "image quantity setting: +1" option is also displayed as gray or dark. After receiving a multi-imaging effect display instruction triggered by the user by tapping the option 341, the smartphone may control the content in the option 341 and the content in the option 342 to be highlighted. Then the user can change a quantity in "image quantity setting: +1".

In some embodiments, the user taps "+1" in the option 342, and correspondingly, after receiving an instruction input by the user by tapping the option 342, the smartphone may display, for example, a scrollable digital option menu. Further, the smartphone displays different data in the digital menu in response to an up/down sliding gesture instruction of the user. For example, a quantity of target images determined by the user and received by the smartphone is "2". Then the smartphone can control the drop-down menu 340 to be hidden. Correspondingly, the GUI 34 is updated to a GUI 35. In some other embodiments, the smartphone may sequentially display numbers such as "2", "3", and "4" in response to a gesture instruction of the user sliding left within an area of the option 342. In this scenario, the smartphone may update "+1" in the option 342 to "+2" in response to the gesture instruction of the user. In addition, if a sliding action of the user is excessively fast, after "+1" in the option 342 is updated to "+4", the user may slide right. Correspondingly, after the smartphone receives a leftward gesture instruction, the numbers "4", "3", and "2" are displayed in sequence. The user may stop sliding after "+2" in the option 342. Then the smartphone can control the drop-down menu 340 to be hidden. Correspondingly, the GUI 34 is updated to the GUI 35.

In a possible implementation, a maximum value of a quantity of images that can be selected by the user may be, for example, a total quantity of photographing modes supported by the smartphone. For example, the smartphone illustrated in this embodiment supports 20 photographing modes. Correspondingly, a maximum quantity of photographing modes seen by the user in the scenario shown in FIG. 2A-4 may be 20.

As shown in FIG. 2A-5, the GUI 35 and the GUI 32 are basically the same. For interface elements included in the GUI 35 and functions of the interface elements, refer to the description of the scenario illustrated in FIG. 2A-2. Details are not described herein again. Further, after the foregoing settings in FIG. 2A-1 to FIG. 2A-4 are completed, the smartphone may perform photographing in a target photographing scene after receiving a photographing start instruction input by the user by tapping the photographing trigger button illustrated in the GUI 35, and then generate images with a plurality of imaging effects of the target photographing scene. For a related embodiment in which the smartphone generates images with a plurality of imaging effects, refer to the following description in this specification. Details are not described herein.

In some possible implementation solutions, after photographing is completed, the smartphone automatically displays a preview window, so that the user can view the plurality of shot images. In some possible implementation solutions, after photographing is completed, the smartphone may receive a preview instruction input by the user by tapping a photo preview button in the GUI 35, and then the smartphone displays the plurality of images obtained by performing photographing. Correspondingly, the GUI 35 is switched to a GUI 36.

In some possible implementation solutions, the user may manually cancel photographing in the photographing process, and the smartphone terminates the photographing process and saves a shot image. In some other possible implementation solutions, the user may manually cancel photographing in the photographing process, and the smartphone terminates the photographing and deletes a shot image.

Figures 1, 2B:
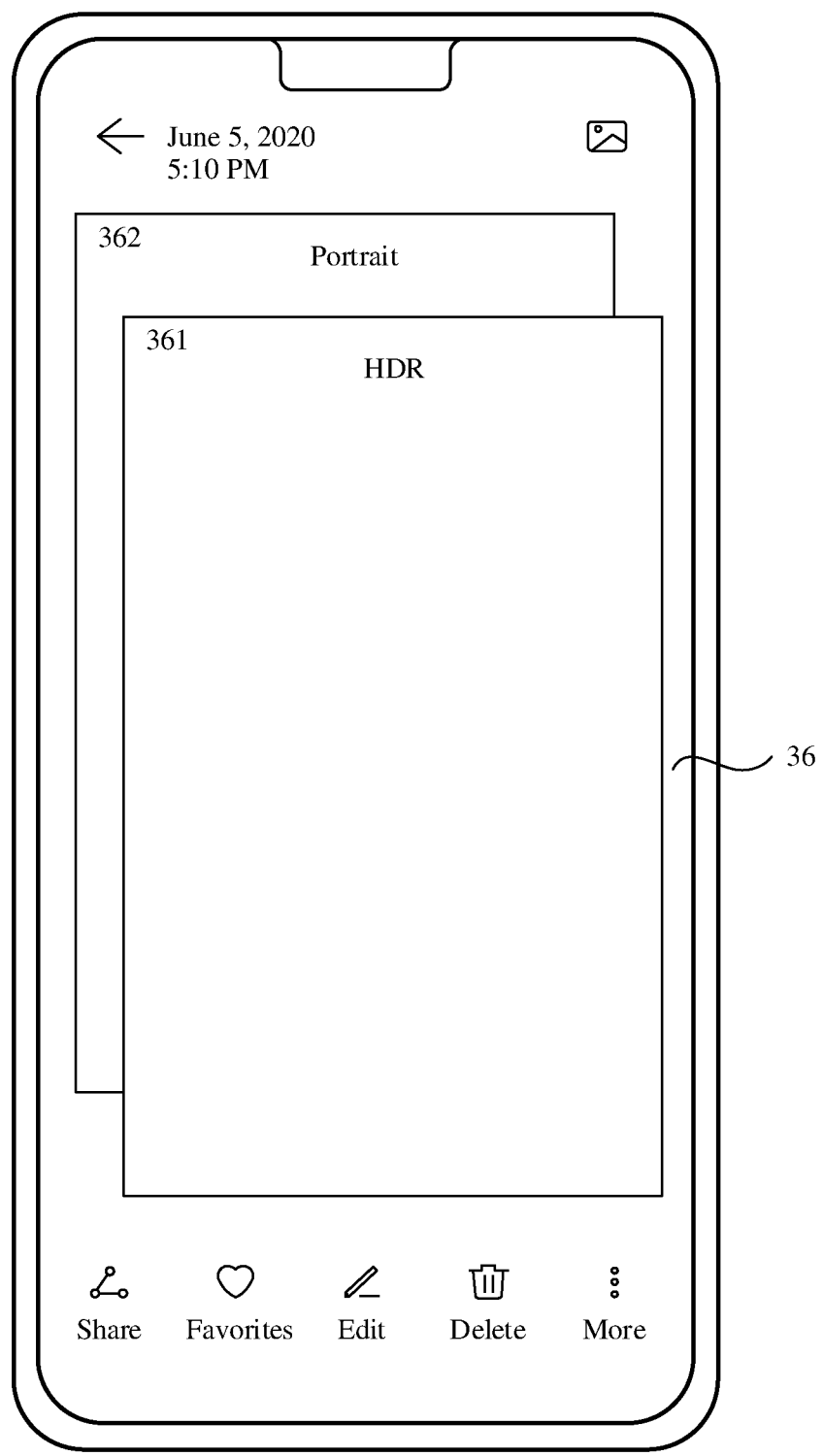
Figures 2, 2B:
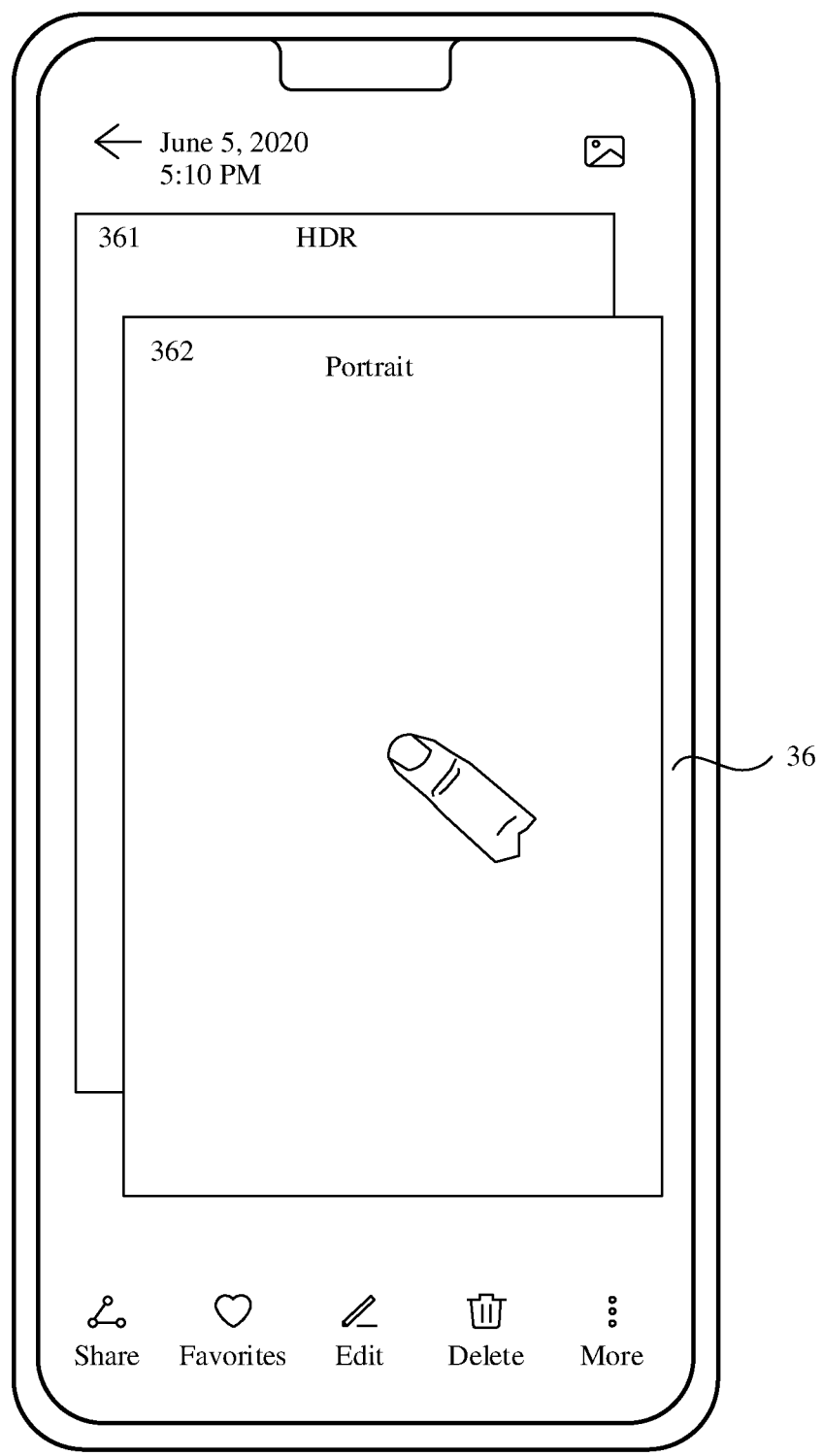
Figures 2, 2B, 3:
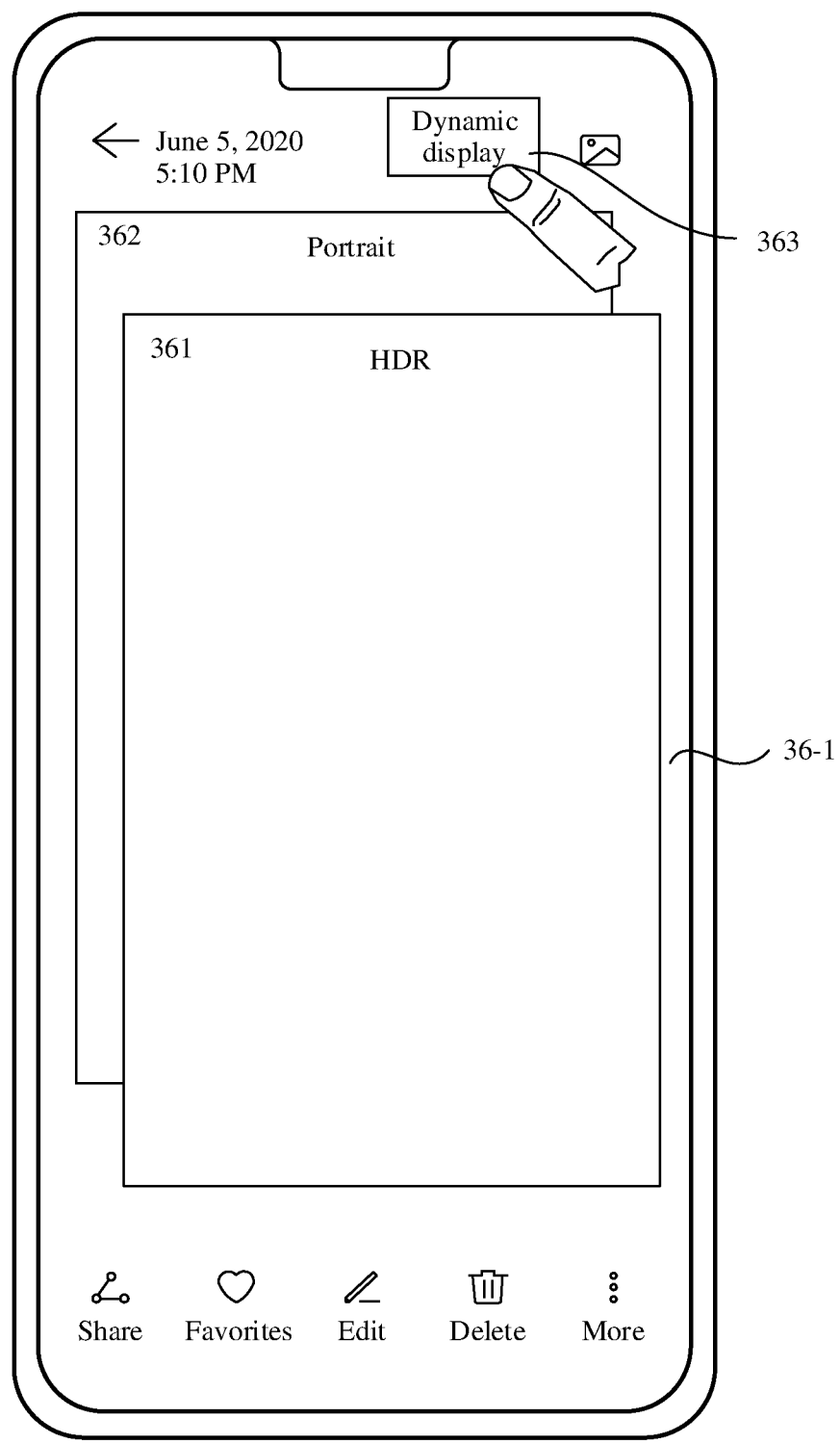
Figures 2, 2B, 3, 4:
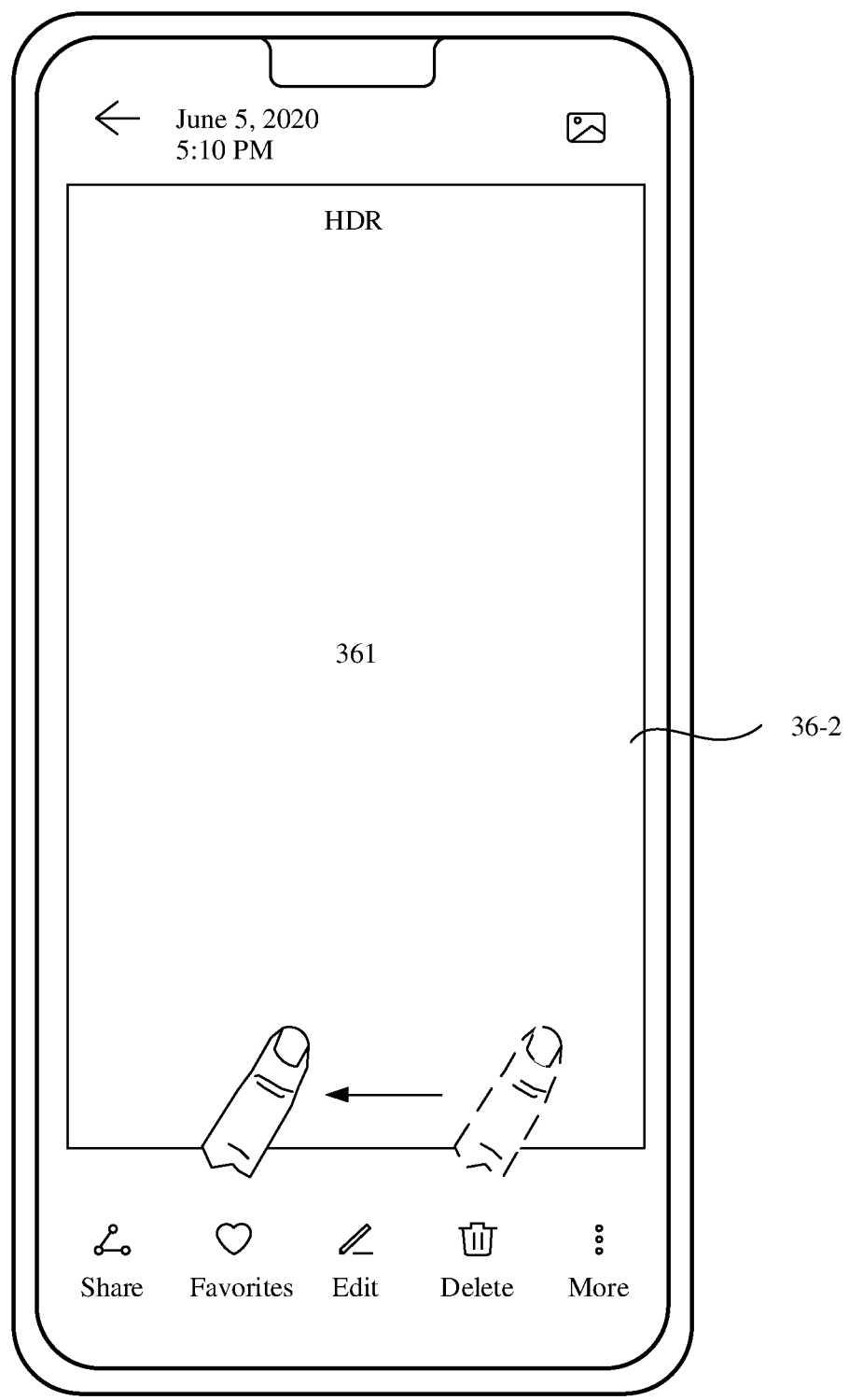
Figures 2, 2B, 3, 4, 5:
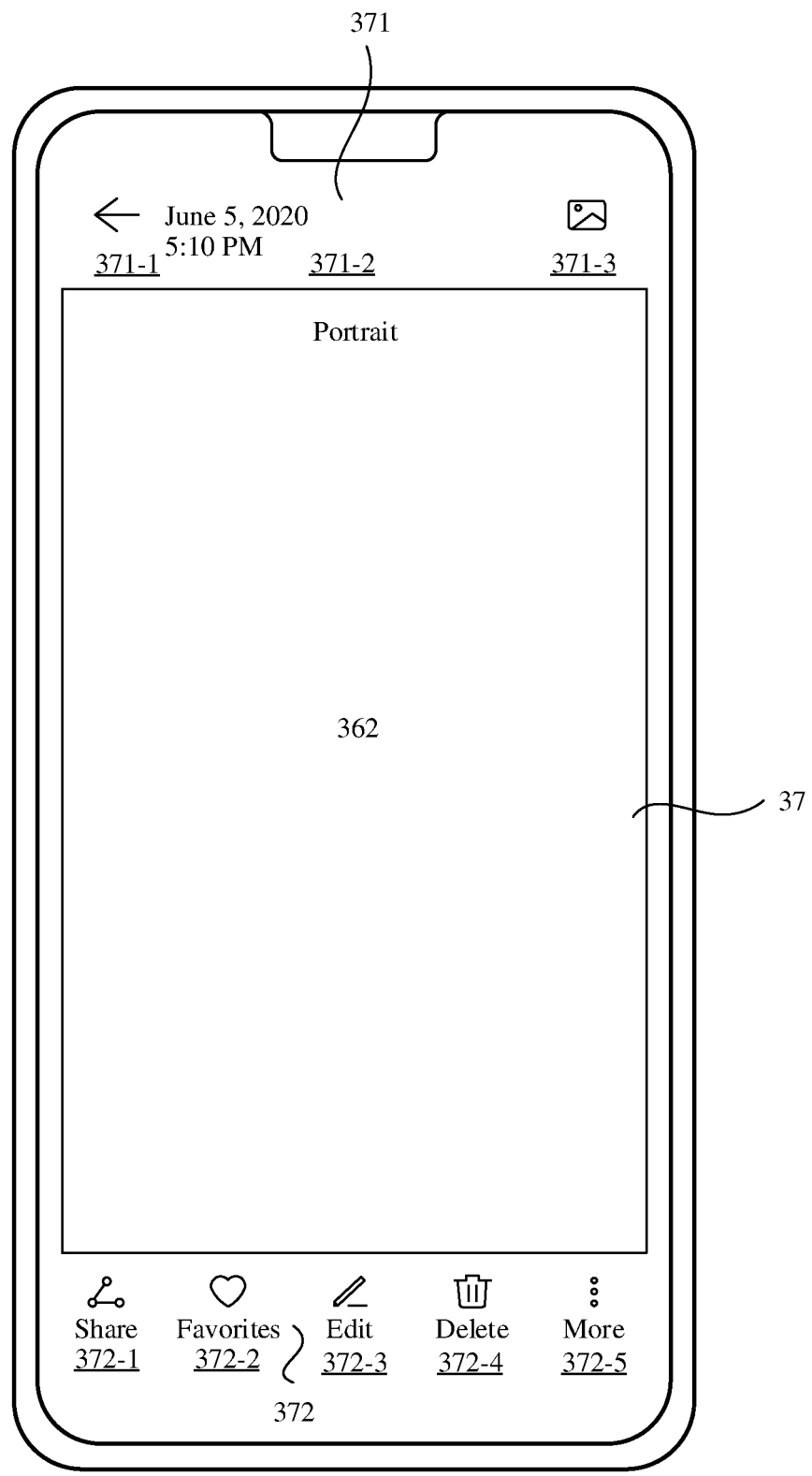
Figures 2, 2B, 3, 4, 5, 6:
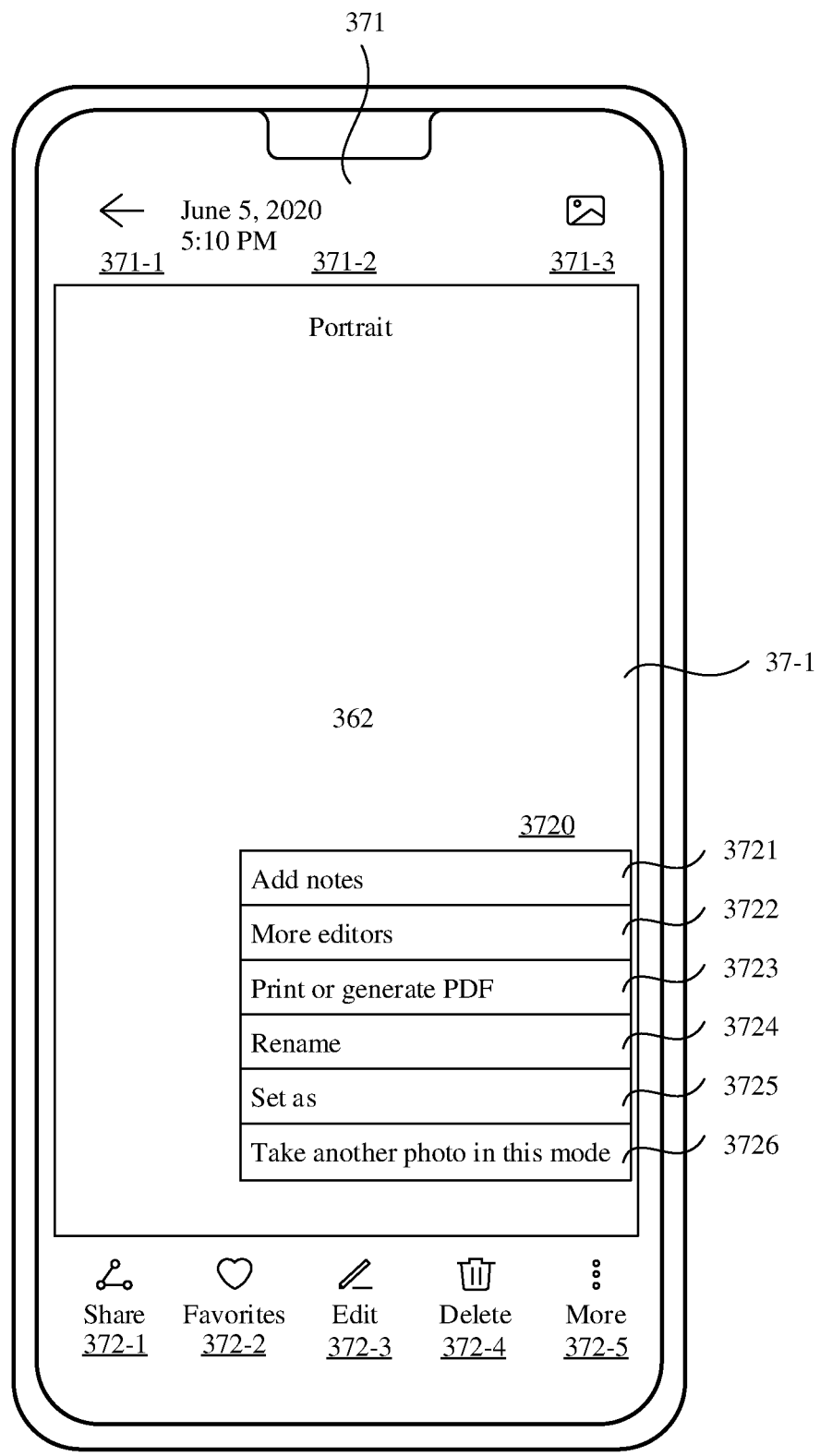
Figures 2, 2B, 3, 4, 5, 6, 7:
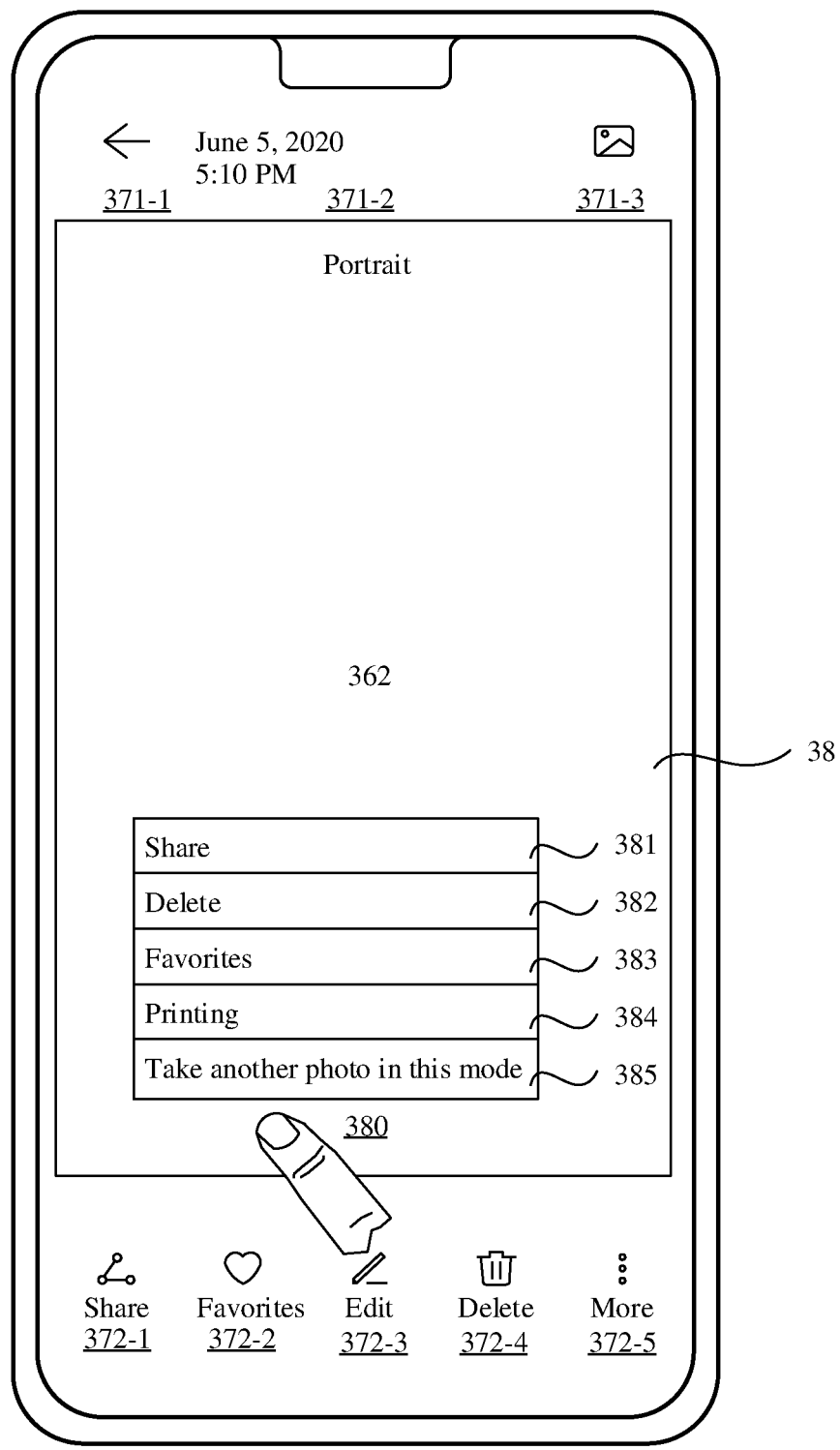

As shown in FIG. 2B-1, the GUI 36 includes an image 361 and an image 362, where the image 361 and the image 362 are optionally displayed in a stacking mode. For example, the image 361 covers the image 362, the image 361 is completely displayed, and only upper and left boundaries of the image 362 are displayed, as described in FIG. 2B-1. For another example, the image 361 completely covers the image 362, and the image 361 is completely displayed, but the image 362 is not displayed. Both the image 361 and the image 362 are images of the target photographing scene, and imaging effects of the image 361 and the image 362 are different.

As shown in FIG. 2B-2, the user may touch and hold the interface of the GUI 36, and correspondingly, after detecting a touch and hold gesture instruction input by the user, the smartphone may control the image 361 and the image 362 to be cyclically displayed at a frontmost end on a display, where a duration of continuously displaying each image at the frontmost end is, for example, 1 second. When the user wants to view any image, the user may stop the touch and hold operation. Correspondingly, if the smartphone does not detect a touch and hold instruction, the smartphone stops dynamic displaying of the image, so that when dynamic displaying stops, the image is displayed at the frontmost end statically. For example, if the user wants to view the image 362, the user may stop touching and holding when the image 362 is displayed at the frontmost end, so that the image 362 is statically displayed on the smartphone.

In some other embodiments, as shown in FIG. 2B-3, a GUI 36-1 further includes a button 363 in addition to the images 361 and 362 that are displayed in the stacking mode. The button 363 may include, for example, a mark "dynamic display". If the user taps the button 363, the smartphone receives an instruction for dynamically displaying the image 361 and the image 362, and then controls the image 361 and the image 362 to be cyclically displayed at the frontmost end on the display, where a duration of continuously displaying each image at the frontmost end is, for example, 1 second. In this embodiment, when the user wants to view any image, when the image is displayed at the frontmost end, the user may tap the button 363 again or tap the image displayed at the frontmost end. Correspondingly, after receiving an instruction triggered again by the user, the smartphone stops dynamically displaying the images, thereby ensuring that the images displayed at the frontmost end are statically displayed.

It may be understood that the continuous image displaying duration in FIG. 2B-2 and FIG. 2B-3 may be preset by a processor of the smartphone, or may be set by the user. In addition, in some other embodiments, in the scenarios of dynamic displaying in FIG. 2B-2 and FIG. 2B-3, the continuous image displaying duration may alternatively be 2 seconds. This is not limited herein.

Both the scenarios illustrated in FIG. 2B-2 and FIG. 2B-3 are implementation scenarios of dynamic image displaying. In some other embodiments, the user taps the image 361 in the GUI 36, the GUI 36 is updated to a GUI 36-2 shown in FIG. 2B-4, and the image 361 in the GUI 36-2 is displayed in an interface of the smartphone. Further, the user may slide left. Correspondingly, the smartphone may switch, in response to the sliding instruction, the image 361 displayed in the interface to the image 362. Further, if the user slides right again, the smartphone may switch, in response to the sliding instruction, the image 362 displayed in the interface to the image 361.

In a possible implementation, in the scenarios illustrated in FIG. 2B-1 to FIG. 2B-4, the image 361 and the image 362 are marked with photographing modes, and each image is marked with a photographing mode that is used by the smartphone when the image is obtained. For example, the image 361 is marked with HDR, and the image 362 is marked with the portrait mode. To be specific, the image 361 is an image obtained by the smartphone by performing photographing in the HDR mode, and the image 362 is an image obtained by the smartphone by performing photographing in the HDR mode. In another possible implementation, in the scenarios illustrated in FIG. 2B-1 to FIG. 2B-4, the image being displayed in the interface is further marked with a photographing mode corresponding to the image.

Further, in a process of previewing an image, the user may further perform another operation, for example, deleting, on any image displayed by the smartphone. After shooting the image 361 and the image 362, the smartphone may automatically save the image 361 and the image 362.

In some possible implementation solutions, after detecting that photographing is completed, the smartphone automatically displays an image for the user to preview. In this case, the smartphone can detect an operation performed by the user on one or more images, such as saving or deleting, and save the processed one or more images to an album.

In some possible implementation solutions, after detecting that photographing is completed, the smartphone automatically saves the image to the album. The smartphone can detect operations such as modifying or deleting one or more images in the album by the user.

In some embodiments, in a GUI 37 shown in FIG. 2B-5, in a scenario in which the user previews an image, when the smartphone statically displays any image, the GUI 37 includes an image status area 371, a statically displayed image (for example, the image 362), and an operation area 372. The image status area 371 includes icon elements such as return 371-1, shooting time 371-2 of the image 362, and gallery 371-3. The return 371-1 is used to return, in response to a trigger of the user, to the photographing interface illustrated in FIG. 2A-5. The gallery 371-3 is used to enter the gallery 3113 of the smartphone in response to a trigger of the user. The operation area 372 includes functional icon elements such as share 372-1, favorites 372-2, edit 372-3, delete 372-4, and more 372-5. Each functional icon element included in the operation area 372 is a functional entry for the user to perform different operations on the image 362. For example, the share 372-1 is used to receive a tapping operation of the user and generate a sharing instruction. After receiving the sharing instruction, the smartphone may display an entry to another APP in the interface, for example, an entry to the email 3114 or messages 3125. The favorites 372-2 is used to receive a tapping operation of the user and generate a favorites instruction. After receiving the favorites instruction, the smartphone stores the image 362 in a favorites folder in the gallery 3113. The edit 372-3 is used to receive a tapping operation of the user and generate an editing instruction. After receiving the editing instruction, the smartphone may display icon controls of an editing function in the interface, for example, icon controls such as crop, light effect, color, and rotation. The delete 372-4 is used to receive a tapping operation of the user and generate a deletion instruction. After receiving the deletion instruction, the smartphone may delete the image 362. Further, the GUI 37 is updated to the GUI 35. The more 372-5 is used to provide the user with an option entry to other operation functions. After the user triggers the more option 372-5, the smartphone may display icon elements of more operation instructions after receiving an instruction for displaying more operation functions. Correspondingly, the GUI 37 is updated to a GUI 37-1.

As shown in FIG. 2B-6, the GUI 37-1 includes an operation menu 3720. The operation menu 3720 includes option controls such as add notes 3721, more editors 3722, print or generate PDF 3723, rename 3724, set as 3725, and take another photo in this mode 3726. After the user taps a corresponding option control, the smartphone performs a corresponding function. For example, after the user taps the take another photo in this mode 3726, the smartphone receives a photographing instruction for taking another photo in this mode, and further, the GUI 37-1 is updated to the GUI 35, and the smartphone performs photographing in a photographing mode corresponding to the image 362.

In some other embodiments, as shown in FIG. 2B-7, in a scenario in which the user previews an image, when the smartphone statically displays any image, the user may touch and hold a statically displayed image (for example, the image 362). For example, after the smartphone receives a touch and hold operation instruction input by the user, the smartphone displays an operation menu 380 in response to the touch and hold operation instruction, as shown by a GUI 38. The operation menu 380 includes option controls such as share 381, delete 382, favorites 383, print 384, and take another photo in this mode 385. In this embodiment, functions of the option controls and effects after the controls are triggered by the user are described in the embodiments illustrated in FIG. 2B-5 and FIG. 2B-6. Details are not described herein again.

FIG. 2B-1 to FIG. 2B-7 are all described by using an unfoldable-screen smartphone as an example. The smartphone in this embodiment may alternatively be a foldable-screen mobile phone. The foldable-screen mobile phone includes a first screen and a second screen. As a posture of the foldable-screen mobile phone varies, the first screen and the second screen are in different states. For example, when the foldable-screen mobile phone is in a folded state, the first screen and the second screen are respectively located on different surfaces of the foldable-screen mobile phone, and are respectively used as an independent operable screen and a display screen. The embodiments in FIG. 2B-1 to FIG. 2B-7 are applicable to the first screen or the second screen. When the foldable-screen mobile phone is in an unfolded state, the first screen and the second screen form one screen. In this embodiment, the screen formed by the first screen and the second screen in the unfolded state is referred to as a "large screen". The embodiments in FIG. 2B-1 to FIG. 2B-7 are applicable to the large screen formed by the first screen and the second screen. In addition, the foldable-screen mobile phone may further include another display mode.

Figures 1, 2C:
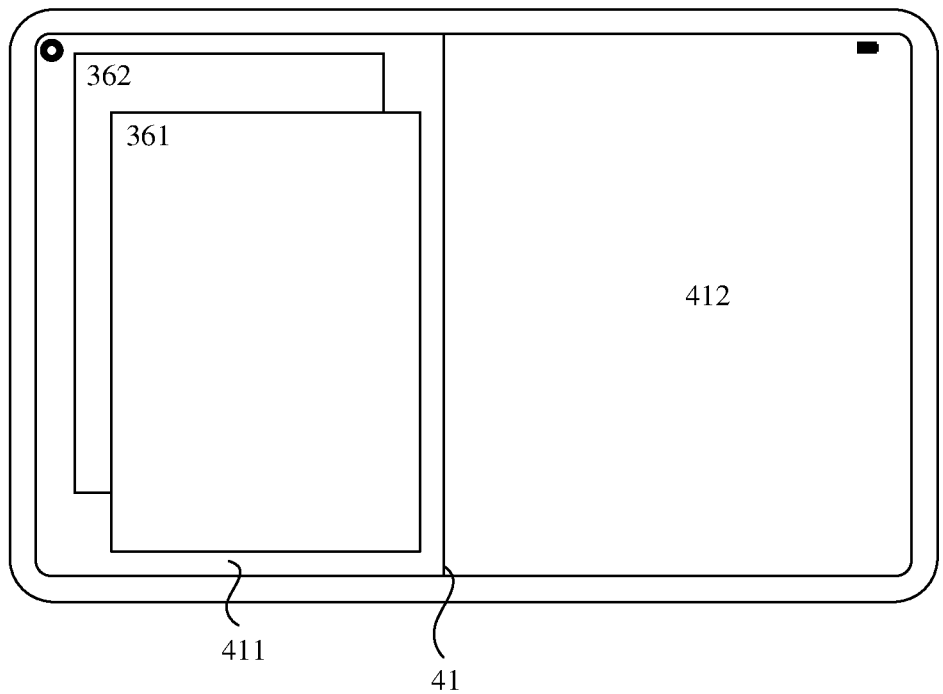
Figures 2, 2C:
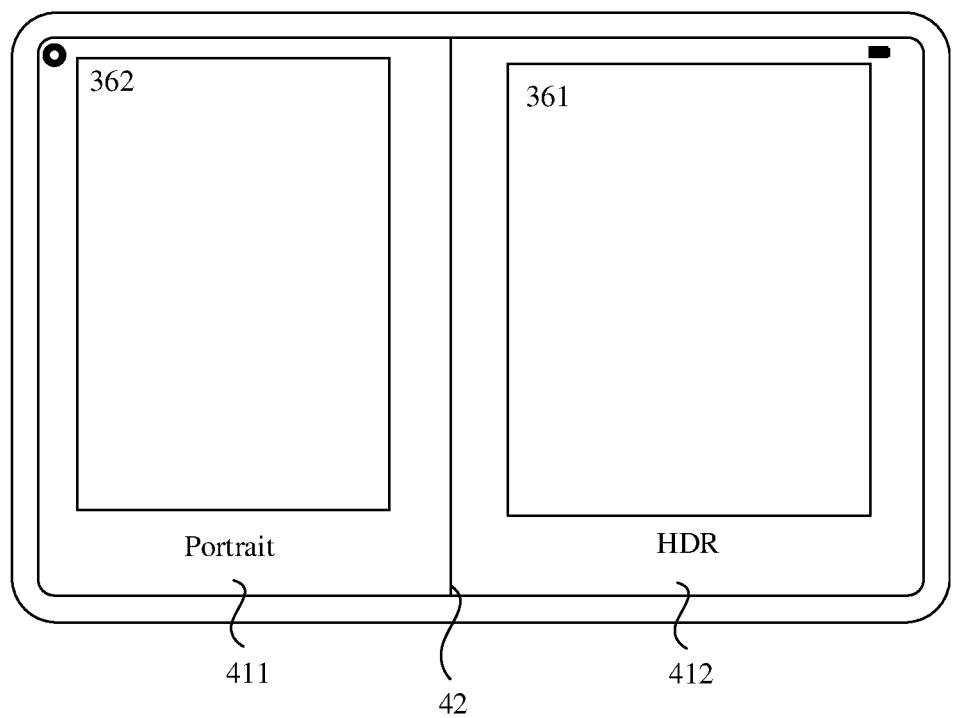
Figures 2, 2C, 3:
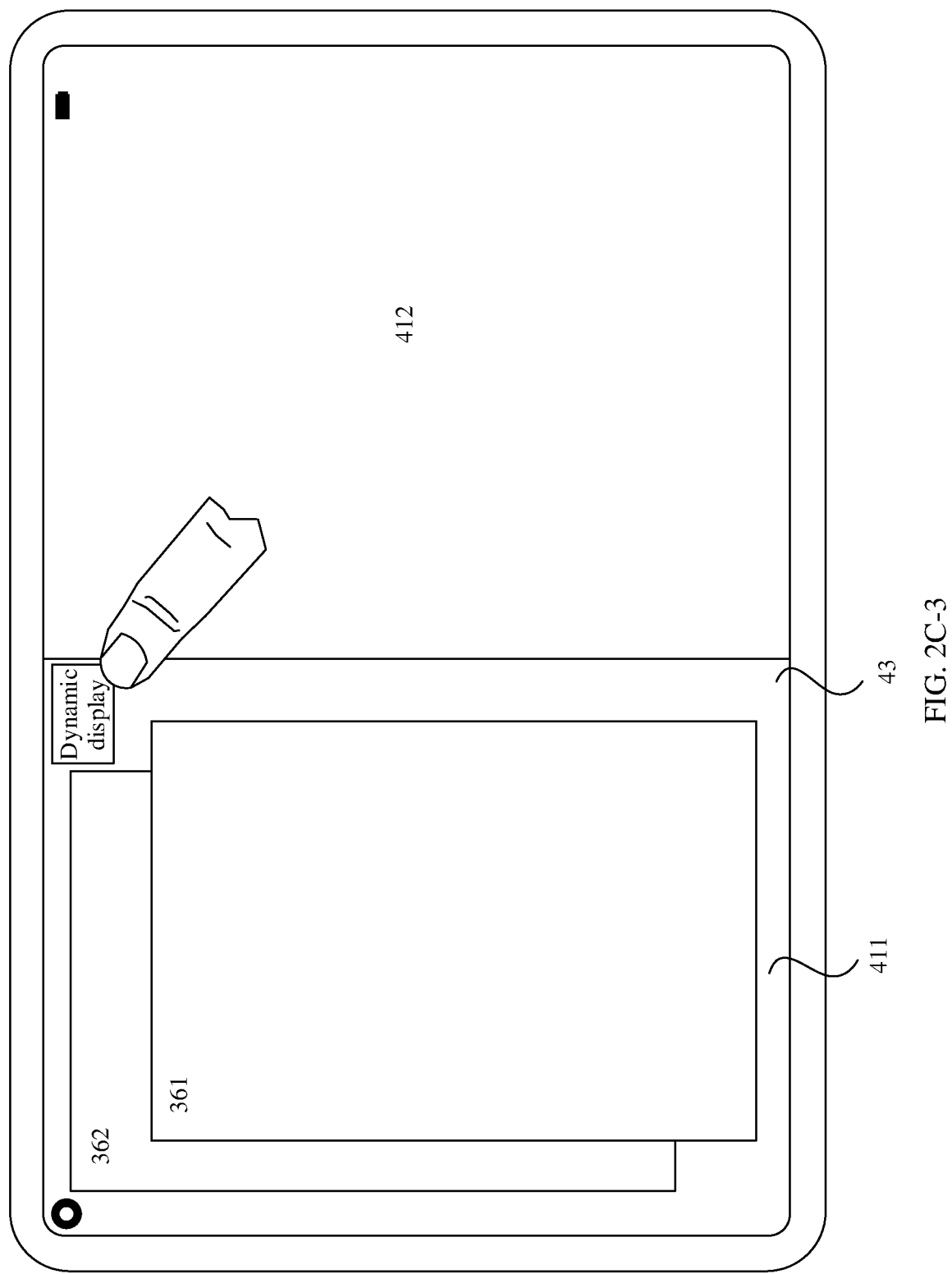
Figures 2, 2C, 3, 4:
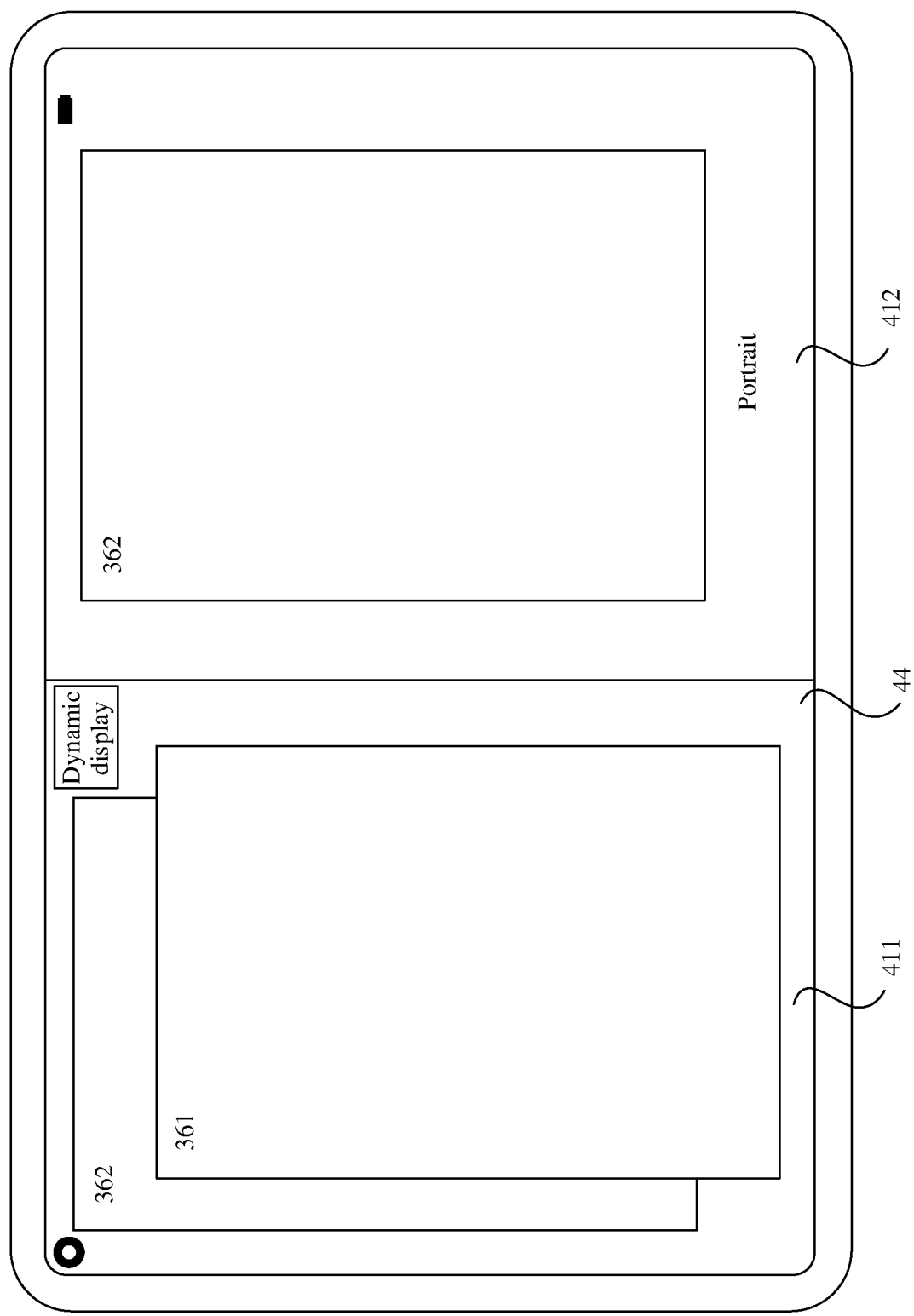
Figure 3:
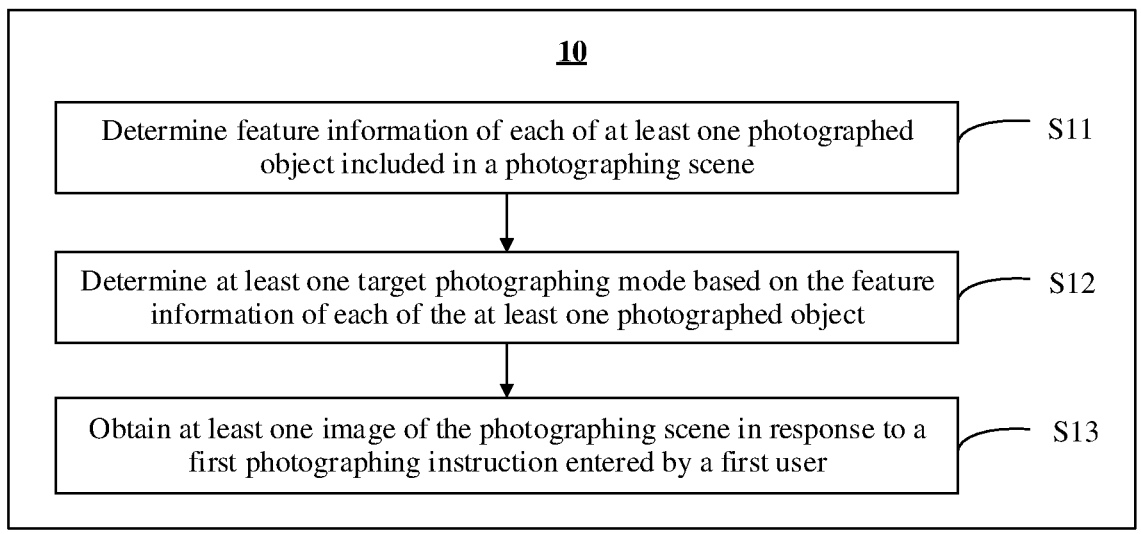

In some embodiments, after photographing is completed, a GUI 41 illustrated in FIG. 2C-1, the image 361, and the image 362 may be displayed on the first screen 411 of the foldable-screen mobile phone in the stacking mode. The display mode of the image 361 and the image 362 is shown in FIG. 2B-1, and details are not described herein again. The user may perform a pinching operation on the image 361. Correspondingly, after receiving a pinching gesture instruction, the foldable-screen mobile phone zooms out the image 361 to a size corresponding to a size of a finger of the user. Then the user may move the pinching gesture to the second screen 412, and further open the gesture and raise the hand on the second screen 412. Correspondingly, the foldable-screen mobile phone receives a move instruction input by the user, and obtains a moving track of the user, and moves the image 361 zoomed out to the second screen 412. Further, after receiving an opening gesture instruction of the user, the foldable-screen mobile phone displays the image 361 on the second screen 412. The GUI 41 is updated to a GUI 42.

As shown in FIG. 2C-2, the first screen 411 in the GUI 42 displays the image 362, and the second screen 412 displays the image 361. In this way, it is convenient for the user to compare images with different imaging effects. Optionally, the user may further switch, by sliding left or right on the second screen 412, the image displayed on the second screen 412. For example, the user slides right on the second screen 412 of the GUI 42, and after receiving a right-sliding gesture instruction, the foldable-screen mobile phone controls the image 361 to move right until the image 361 is hidden, and controls the image 362 to move right so that the image 362 is finally displayed on the second screen 412. If more than two images are obtained by performing photographing, the first screen 411 may display a third image.

In some other embodiments, after photographing is completed, a GUI 43 shown in FIG. 2C-3, the image 361, and the image 362 may be displayed on the first screen 411 of the foldable-screen mobile phone in the stacking mode, and after a trigger of the user is received, the images 361 and 362 may be dynamically displayed on the first screen 411. The dynamic display mode of the image 361 and the image 362 is shown in FIG. 2B-3, and details are not described herein again. In this embodiment, in a process of dynamically displaying the image 361 and the image 362, the user may tap an image that the user wants to view. Correspondingly, after receiving a tapping operation instruction, the foldable-screen mobile phone determines the image corresponding to the tapping operation instruction, and then statically displays, on the second screen 412, the image corresponding to the tapping operation instruction. The GUI 43 is updated to a GUI 44.

As shown in FIG. 2C-4, in the GUI 44, the first screen 411 dynamically displays the image 361 and the image 362, and the second screen 412, for example, statically displays the image 361. In this way, user experience can be improved.

It may be understood that FIG. 2C-1 to FIG. 2C-4 are described merely for illustrative purposes and do not constitute any limitation on this embodiment. In some other embodiments, the first screen 411 and the second screen 412 may be interchanged. This is not limited herein.

In addition, the user may further perform operations such as deleting and sharing the statically displayed images in FIG. 2C-2 and FIG. 2C-4. Optionally, in a process of statically displaying an image on the second screen 412, another operation control may be displayed, and a display mode of the another operation control is shown in any one of FIG. 2B-5 to FIG. 2B-7. Details are not described herein. For example, after the user deletes any image, the foldable-screen mobile phone may delete all corresponding images on the first screen 411 and the second screen 412.

It should be noted that, in some embodiments, the user does not select a photographing mode, but only sets "multi-imaging effect display" and sets "shooting two images". The smartphone displays two images, and displaying of the two images is shown in scenarios illustrated in FIG. 2B-1 to FIG. 2C-4. In some other embodiments, the user selects a photographing mode, sets "multi-imaging effect display", and specifically sets "shooting two images". The smartphone displays three images. The three images include one image obtained by performing photographing in the photographing mode selected by the user, and two images with different imaging effects that are obtained by the smartphone by performing intelligent photographing. Before the user triggers dynamic displaying, the image displayed at the front-most end may be an image with an imaging effect corresponding to the photographing mode selected by the user.

It may be understood that FIG. 2A-1 to FIG. 2C-4 are described merely for illustrative purposes and do not constitute any limitation on this embodiment. In some other embodiments, the GUI in each scenario may vary according to different systems installed on the smartphone, different device brands, different device models, and the like. Details are not described herein again.

It can be learned that, in this implementation, the user may set, based on a requirement, a quantity of images corresponding to one photographing scene, and further obtain images with a plurality of imaging effects of one photographing scene by triggering photographing only once. Then the user can select a satisfactory image from the images with the plurality of imaging effects, so that user experience is better.

The following describes a photographing method in an embodiment of this application from a perspective of an electronic device by using an example. The electronic device in this embodiment includes a camera.

FIG. 3 illustrates a photographing method 10. The photographing method 10 (referred to as the method 10) includes the following steps.

Step S11: Determine feature information of each of at least one photographed object included in a photographing scene.

It may be understood that, in some embodiments, step S11 may be performed before photographing. Specifically, step S1 is performed after a user selects a quantity of target images corresponding to a corresponding embodiment of this application and the electronic device starts framing. Man-machine interaction and GUI displaying in a user setting process may be described in the embodiments shown in FIG. 2A-1 to FIG. 2A-4, and details are not described herein again. In some other embodiments, step S11 may be performed after the electronic device receives a photographing instruction input by the user. In this way, the electronic device can perform some operations such as obtaining feature information only after it is ensured that an image needs to be obtained, so that a waste of computing resources caused by the user's cancellation of photographing after the feature information is obtained in advance can be avoided.

The feature information of the photographed object includes one or a combination of more of the following: a confidence level of the photographed object, a distance between the photographed object and the camera, and an image size. The confidence level is used to represent a level of trust of the photographed object being an object of a type. A higher confidence level indicates a higher level of trust of the photographed object being the object of the corresponding type. Conversely, a lower confidence level indicates a lower level of trust of the photographed object being the object of the corresponding type. For example, if the confidence level of the photographed object being a person is higher than 0.95, it indicates that the level of trust of the photographed object including the person is higher. The image size refers to an area occupied by the photographed object in a display interface. Optionally, in some scenarios, the feature information of the photographed object includes the confidence level of the photographed object.

In some embodiments, the electronic device may use a model "you only look once (YOLO)", a single shot multibox detector (SSD) model, or the like, to detect a photographed object included in the photographing scene, and obtain, through calculation, a confidence level x of each photographed object and a percentage y of an area occupied by the photographed object in a viewfinder window 321. The percentage y of the area occupied in the display interface indicates an image size of a corresponding photographed object. Herein, x is a value greater than 0 and less than 1, and y is a value greater than 0 and less than or equal to 1. For example, if photographed objects are all texts, y is 1.

In some other embodiments, on a basis of obtaining through calculation the confidence level x and the percentage y of the area occupied in the display interface, the electronic device may further use infrared ranging, laser ranging, ultrasonic ranging, or the like of the electronic device to measure a distance z' between each photographed subject and the electronic device based on a time of flight (ToF) ranging principle. The distance z' may be measured in meters (m), and z' is an integer greater than 0. After determining the distance z' between each photographed object and the electronic device, the electronic device may perform normalization processing on the distance z', to convert the distance between each photographed object and the electronic device into a value in a same dimension as the confidence level x and the percentage y of the area occupied in the display interface. For example, a distance z after the normalization processing may be represented as $$z = 1 - \frac{z'}{l},$$

where l is a maximum photographing distance supported by the electronic device, and z is a value greater than 0 and less than 1. Optionally, when the distance between the photographed object and the electronic device exceeds the maximum photographing distance supported by the electronic device, the electronic device may determine the distance between the photographed object and the electronic device as the maximum photographing distance supported by the electronic device.

Figure 4A:
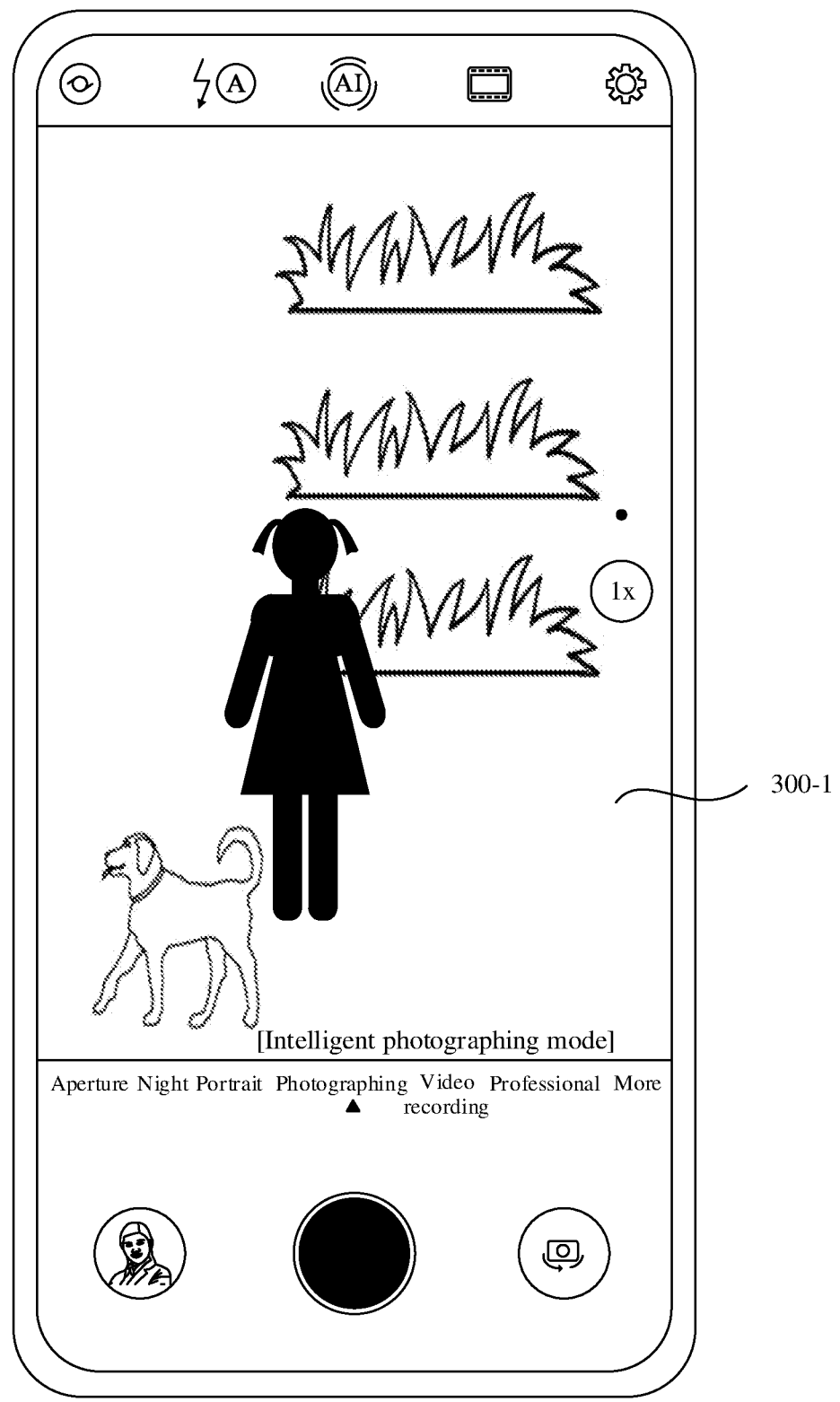
FIG. 4A is a schematic diagram of an example interface in a photographing scene 300-1 according to an embodiment of this application.
Figures 1, 4A:
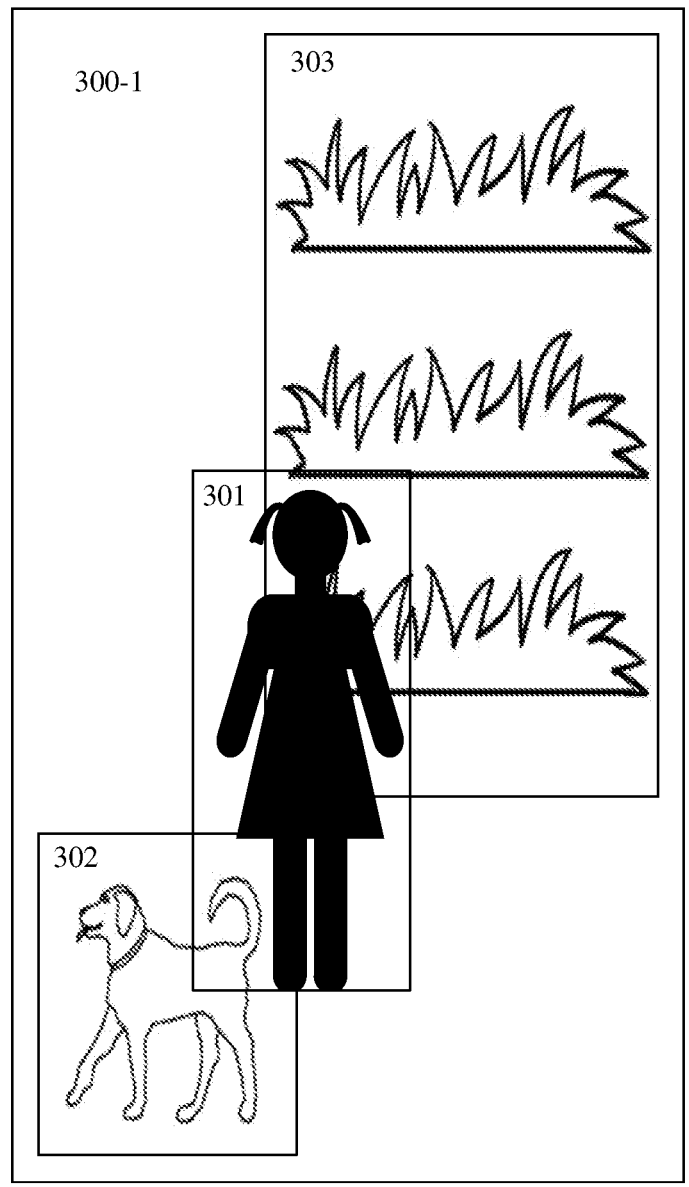

For example, the electronic device obtains a photographing scene 300-1 shown in FIG. 4A. With reference to FIG. 4A-1, the electronic device can detect a photographed object 301, a photographed object 302, and a photographed object 303. As shown in FIG. 4A-1, the electronic device may mark the photographed objects by using rectangular boxes. Further, the electronic device may separately calculate confidence levels of the photographed object 301, the photographed object 302, and the photographed object 303 to obtain a confidence level 0.999 of the photographed object 301 being a person, a confidence level 0.999 of the photographed object 302 being a dog, and a confidence level 0.998 of the photographed object 303 being a lawn. The electronic device may further determine image sizes of the photographed object 301, the photographed object 302, and the photographed object 303 by calculating a percentage of an area occupied by a rectangular box of each photographed object (that is, a percentage of the area occupied by the rectangular box corresponding to each photographed object in the display interface). For example, a percentage of an area occupied by the rectangular box of the photographed object 301 is 40%, and correspondingly, the image size of the photographed object 301 is 0.4. A percentage of an area occupied by the rectangular box of the photographed object 302 is 10%, and correspondingly, the image size of the photographed object 302 is 0.1. A percentage of an area occupied by the rectangular box of the photographed object 303 is 60%, and correspondingly, the image size of the photographed object 303 is 0.6. It should be understood that FIG. 4A-1 illustrates a visual representation of processing the photographing scene 300-1 by the electronic device.

Figure 4B:
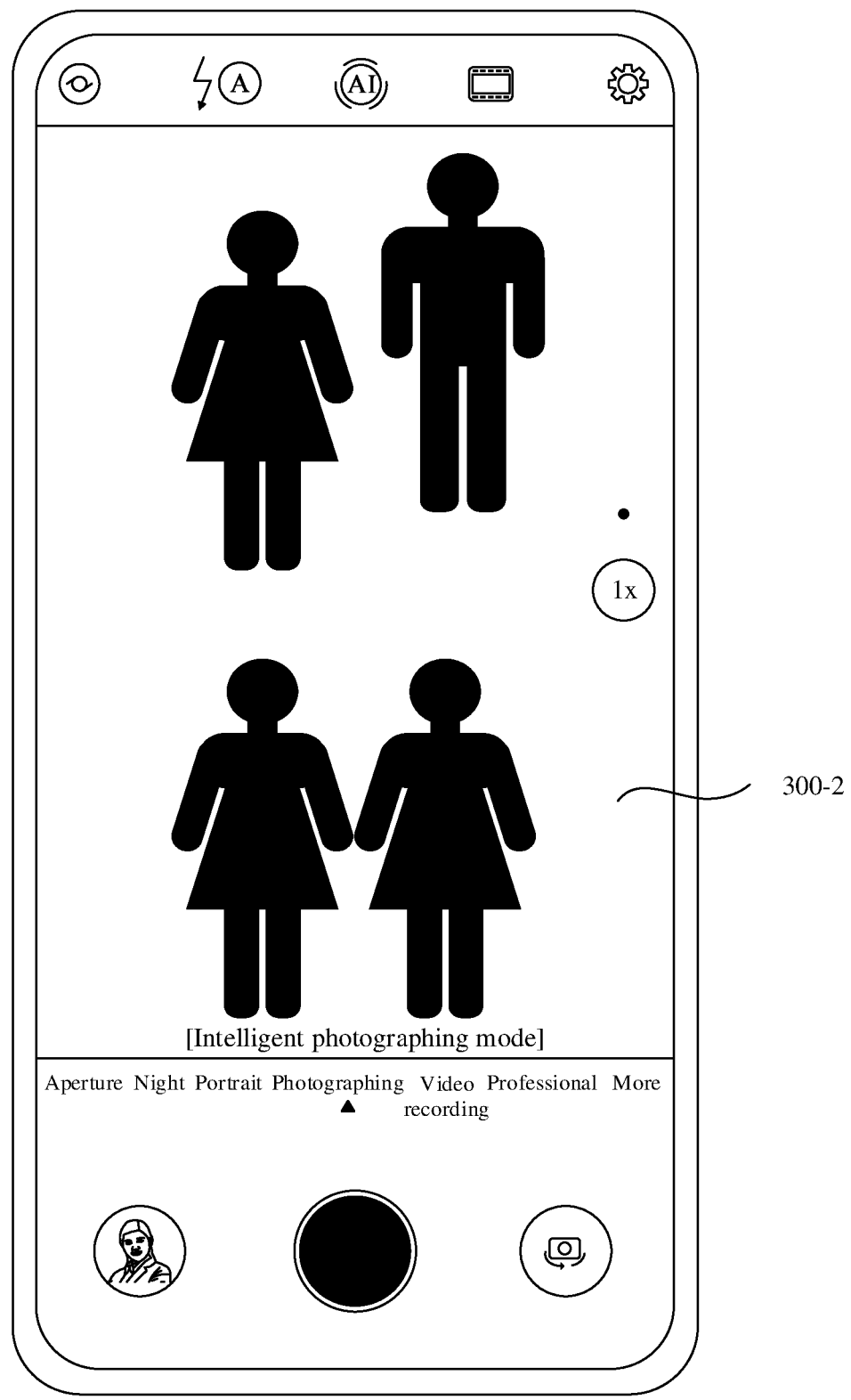
FIG. 4B is a schematic diagram of an example interface in a photographing scene 300-2 according to an embodiment of this application.
Figures 1, 4B:
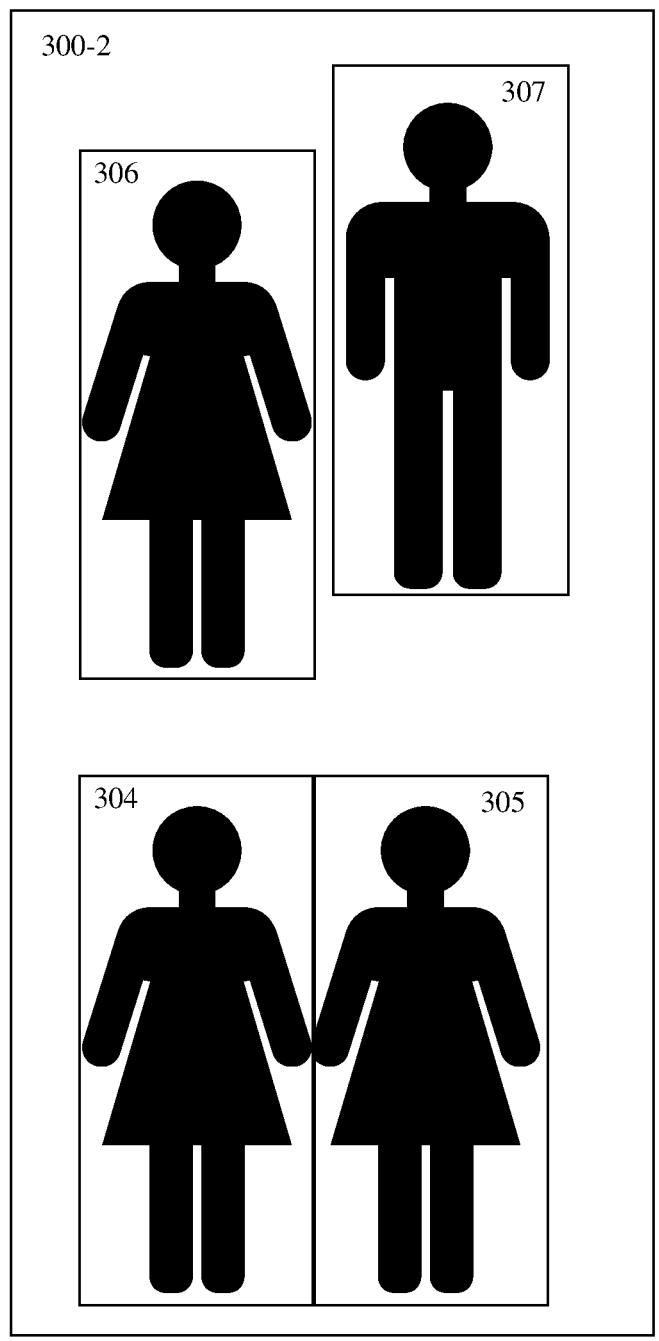

For another example, the electronic device obtains a photographing scene 300-2 shown in FIG. 4B. With reference to FIG. 4B-1, the electronic device can obtain, through calculation, confidence levels of a photographed object 304, a photographed object 305, a photographed object 306, and a photographed object 307 being persons, where the confidence levels are all 0.999. In addition, the electronic device can determine that an image size of the photographed object 304 is 0.2, and an image size of the photographed object 305 is 0.2, and an image size of the photographed object 306 is 0.15, and an image size of the photographed object 307 is 0.12. In this embodiment, a method for calculating the confidence level and the image size of each photographed object by the electronic device is the same as that illustrated in the photographing scene 300-1. Details are not described herein. In addition, the electronic device may further separately detect distances from the photographed object 304, the photographed object 305, the photographed object 306, and the photographed object 307 to the electronic device in a manner of laser ranging, to obtain a distance z1' between the photographed object 304 and the electronic device, a distance z2' between the photographed object 305 and the electronic device, a distance z3' between the photographed object 306 and the electronic device, and a distance z4' between the photographed object 307 and the electronic device. Further, the electronic device performs normalization processing on z1' to obtain a distance z1 between the photographed object 304 and the electronic device. For example, z1 is 0.2. The electronic device performs normalization processing on z2' to obtain a distance z2 between the photographed object 305 and the electronic device. For example, z2 is 0.3. The electronic device performs normalization processing on z3' to obtain a distance z3 between the photographed object 306 and the electronic device. For example, z3 is 0.5. The electronic device performs normalization processing on z4' to obtain a distance z4 between the photographed object 307 and the electronic device. For example, z4 is 0.6. It should be understood that FIG. 4B-1 illustrates a visual representation of processing the photographing scene 300-2 by the electronic device. In an actual implementation, the electronic device does not display rectangular boxes in FIG. 4B-1 in the interface.

It may be understood that the foregoing feature information is described merely for illustrative purposes and does not constitute any limitation on this application. In some other embodiments, the feature information of the photographed object may further include another parameter or information, for example, a hue, luminance, and sensitivity of the photographing scene. For example, the electronic device may further determine, by detecting the hue, luminance, sensitivity, and the like of the photographing scene, whether the photographing scene is a night scene. Further, the electronic device may further use whether the photographing scene is a night scene and the feature information of the photographed object as a basis for determining a target photographing mode.

Step S12: Determine at least one target photographing mode based on the feature information of each of the at least one photographed object.

In some embodiments, the at least one target photographing mode may be one photographing mode, for example, a portrait mode. In some other embodiments, the at least one target photographing mode may include at least two photographing modes, and the at least two photographing modes are different. In this embodiment, a specific value corresponding to the "at least two" may be set by the user.

It should be noted that the feature information of the photographed object can represent salience of the photographed object. Based on this, in this embodiment, the electronic device may perform calculation on the feature information of each of the at least one photographed object to obtain a calculation result corresponding to each photographed object. Then the electronic device may sequentially select a preset quantity of photographing modes in descending order of the calculation results to obtain the at least one target photographing mode. In this way, based on an order of the salience of the photographed object, the electronic device can select a photographing mode that better matches the photographing scene.

In some embodiments, the confidence level representing the photographed object may correspond to a photographing mode. For example, if the confidence level of the photographed object being a person is higher than 0.95, the confidence level may correspond to the portrait mode. For another example, if the confidence level of the photographed object being an object is higher than 0.99, the confidence level may correspond to an HDR mode. Based on this, the electronic device may calculate a comprehensive score E of the feature information of each photographed object according to an algorithm $E=\alpha x+\beta y+\gamma z$, where x is the confidence level of the photographed object, y is the image size of the photographed object, z is the distance between the photographed object and the camera, $\alpha$ is a first weight of the confidence level of the photographed object, $\beta$ is a first weight of the image size of the photographed object, $\gamma$ is a first weight of the distance between the photographed object and the camera, and all of $\alpha$, $\beta$, and $\gamma$ are values greater than 0 and less than 1. For example, $\alpha$ is 0.33, $\beta$ is 0.33, and $\gamma$ is 0.34. $\alpha$, $\beta$, and $\gamma$ may be arbitrarily adjusted based on a requirement. Then the electronic device may sequentially select a preset quantity of confidence levels in descending order of the comprehensive scores E to obtain at least one target confidence level. Further, the electronic device determines a photographing mode corresponding to the at least one target confidence level as a target photographing mode, to obtain the at least one target photographing mode. For example, the electronic device selects two target photographing modes, and labels of photographed objects corresponding to first two confidence levels that are sequentially selected in descending order of the comprehensive scores E are [person, beautiful scenery], where a photographing mode corresponding to "person" is the portrait mode, and a photographing mode corresponding to "beautiful scenery" is the HDR mode. Correspondingly, the two target photographing modes selected by the electronic device are [portrait mode, HDR mode].

In some other embodiments, in a non-multi-person photographing scene illustrated in FIG. 4A, when different photographed objects are used as photographed subjects in the photographing scene, photographing modes adapted to the photographing scene are different. For example, when a person is used as a photographed subject in the photographing scene, a photographing mode adapted to the photographing scene is the portrait mode. For another example, when a lawn is used as a photographed subject in the photographing scene, a photographing mode adapted to the photographing scene is the HDR mode. Based on this, the electronic device may determine, based on the feature information of each of the at least one photographed object, a probability that the photographed object is used as a photographed subject. Then the electronic device may sequentially select a preset quantity of photographed objects in descending order of probabilities as target photographed objects, and further determine a photographing mode adapted when each target photographed object is used as a photographed subject, to obtain the at least one target photographing mode.

For example, the electronic device may determine, according to an algorithm $P=ax+by+cz$, a probability value P that each photographed object is used as a photographed subject, where x, y, and z are the feature information of the photographed object. For specific meanings of x, y, and z and the determining process, refer to the description in the foregoing embodiment. Details are not described herein. a is a second weight of the confidence level of the photographed object, b is a second weight of the image size of the photographed object, c is a second weight of the distance between the photographed object and the camera, and all of a, b, and c are values greater than 0 and less than 1. Values of a, b, and c may be arbitrarily adjusted based on a requirement. This is not limited herein. Further, the electronic device may sequentially select a preset quantity of photographed objects in descending order of the probability values P as target photographed objects, to obtain at least one target photographed object; and then the electronic device determines a photographing mode matched when each of the at least one target photographed object is used as a photographed subject, to obtain the at least one target photographing mode.

It should be noted that, in some embodiments, the photographing scene includes a relatively large quantity of photographed objects, but some photographed objects, for example, a person whose distance from the electronic device is longer than 5 m or more, may not be used as photographed subjects. Based on this, to save computing resources of the electronic device, the electronic device may select, from the at least one photographed object, a photographed object that meets the following condition, and further calculate a probability that the selected photographed object is used as a photographed subject. For example, the selection condition includes: the confidence level of the photographed object being a person is higher than 0.95, the image size is greater than 0.1, and the distance between the photographed object and the electronic device is shorter than 2 m; or the confidence level of the photographed object being a text or an object is higher than 0.9, and the image size is greater than 0.5.

In addition, if the electronic device determines that the photographing scene is a night scene, the electronic device may use a night mode as one of the photographing modes. Further, in a possible implementation, the electronic device may determine a preset quantity minus one target photographed object in the manner described in the foregoing embodiment, and then determine another photographing mode based on the target photographed object. In another possible implementation, the electronic device may determine a preset quantity of target photographed objects in the manner described in the foregoing embodiment, and further determine the preset quantity plus one photographing mode. This is not limited herein.

In some other embodiments, in a multi-person photographing scene illustrated in FIG. 4B, the photographed objects include a plurality of persons. Correspondingly, the electronic device may perform photographing in the photographing scene by using the portrait mode. In this embodiment, the electronic device may determine a preset quantity of target persons based on a distance between each person and the electronic device, and determine the preset quantity of target persons as target photographed objects.

For example, the electronic device may calculate the distance between each person and the electronic device, and then the electronic device may sequentially select a preset quantity of persons in ascending order of distances as target photographed objects.

In addition, if the electronic device determines, by measuring the sensitivity, that the current photographing scene is a night scene, the electronic device may use the night mode to perform photographing in the photographing scene illustrated in FIG. 4B. In this embodiment, an implementation of determining the preset quantity of persons by the electronic device is described above, and details are not described herein again.

It should be noted that the preset quantity may be set by the user based on a requirement by using an option such as "multi-imaging effect display". The preset quantity is, for example, 2. Man-machine interaction and GUI displaying in the user setting process may be described in the embodiments shown in FIG. 2A-2 and FIG. 2A-4, and details are not described herein.

It may be understood that the foregoing method for determining the target photographed object is described merely for illustrative purposes and does not constitute any limitation on this application. In some other embodiments, the electronic device may further determine the target photographed object in the photographing scene based on other information.

Step S13: Obtain at least one image of the photographing scene in response to a first photographing instruction input by a first user.

An embodiment in which the first user inputs the first photographing instruction is shown in FIG. 2A-5, and details are not described herein. The first photographing instruction may alternatively be another input such as a voice input, a mid-air gesture input, or a user gaze input. This is not limited in this embodiment of this application. An imaging effect of the at least one image corresponds to the at least one target photographing mode.

With reference to the foregoing description of the at least one target photographing mode and the implementation scenario, in this embodiment of this application, the electronic device may obtain at least one image in the following implementations.

In some embodiments, when the at least one target photographing mode includes at least two photographing modes, and the at least two photographing modes are different, each of the at least two photographing modes is used to obtain an image of the photographing scene, so as to obtain at least two images of the photographing scene.

For example, with reference to the non-multi-person photographing scene illustrated in FIG. 4A, after determining that the photographing modes are the portrait mode and the HDR mode, the electronic device separately obtains images of the photographing scene 300-1 by using the portrait mode and the HDR mode, to obtain two images of the photographing scene 300-1. Imaging effects of the two images are different.

According to the foregoing man-machine interaction embodiment, the user may further autonomously select a photographing mode to perform image shooting. Based on this, in some embodiments, if the at least one photographing mode determined by the electronic device does not include the photographing mode selected by the user, the electronic device may separately perform photographing by using the at least one photographing mode and the photographing mode selected by the user, to obtain at least one image. In some other embodiments, if the at least one photographing mode determined by the electronic device does not include the photographing mode selected by the user, the electronic device may separately perform photographing by using the at least one photographing mode, to obtain at least one image.

In addition, a current electronic device usually includes a plurality of cameras. For example, some electronic devices may include three rear-facing cameras and one front-facing camera. In some possible implementation solutions, each time the electronic device performs photographing in one photographing mode, one of a plurality of cameras is invoked to perform photographing. Different cameras have different features, and a single camera may not match a corresponding photographing mode well, causing a poor photographing effect. In some embodiments of this application, when performing photographing in any one of the foregoing photographing modes, the electronic device invokes a plurality of cameras to perform combined photographing. In this way, a corresponding photographing mode can be adapted to a greatest extent, and an advantage of each camera can be fully used, so that a photographing effect is better. In this implementation, not only intelligence is high, but also each imaging effect is better, thereby further improving user experience.

Figure 5A:
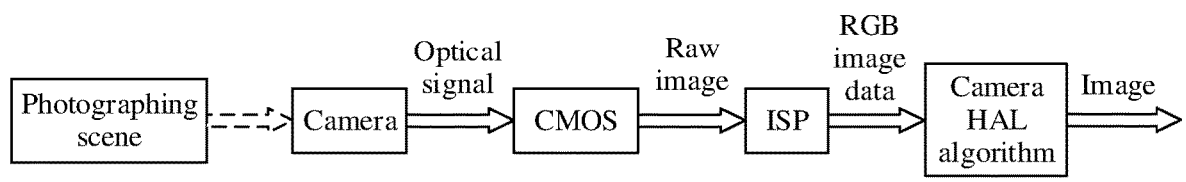
FIG. 5A is a schematic diagram of a conventional processing procedure for generating an image by an electronic device according to an embodiment of this application.

As shown in FIG. 5A, a conventional processing procedure in which an electronic device generates an image of a photographing scene includes: the electronic device invokes a camera to obtain an optical signal of the photographing scene, then invokes a complementary metal-oxide-semiconductor (CMOS) to convert the optical signal into a raw (RAW) image of the photographing scene, and then performs image signal processing (ISP) processing on the raw image to obtain a red, green, and blue (RGB) image of the photographing scene; and then the electronic device performs camera hardware abstraction layer (HAL) algorithm processing on the RGB image to obtain an image of the photographing scene. A process in which the electronic device invokes the camera to obtain an optical signal in the photographing scene may also be referred to as "framing". The framing process performed by the electronic device relates to parameters such as sensitivity, exposure time, and 3A parameters, and these parameters are referred to as framing parameters. The 3A parameters refer to an automatic white balance (AWB) parameter, an automatic exposure (AE) parameter, and automatic focus (AF). The sensitivity may be specified by the International Organization for Standardization (ISO). Therefore, the ISO may be used to represent the sensitivity.

It should be noted that framing parameters corresponding to different photographing modes may be the same or different. Based on this, for example, in a scenario in which photographing is performed by using two photographing modes, the electronic device may determine whether framing parameter differences between the two photographing modes are all less than thresholds corresponding to corresponding parameters. If the framing parameter differences between the two photographing modes are all less than the thresholds corresponding to the corresponding parameters, the electronic device may perform framing based on framing parameters of either of the two photographing modes. Then the electronic device separately processes the framing parameters according to image processing algorithms of the two photographing modes to obtain two images. If any framing parameter difference between the two photographing modes is greater than a threshold corresponding to a corresponding parameter, the electronic device separately performs photographing based on the two photographing modes to obtain two groups of image data.

For example, the framing parameters include ISO, exposure time, and 3A parameters. If an ISO difference between the two photographing modes is less than a first threshold, and an exposure time difference is less than a second threshold, and a 3A parameter difference is less than a third threshold, the electronic device may determine that the framing parameters of the two photographing modes are close. If one or more of the ISO difference, the exposure time difference, and the 3A parameter difference between the two photographing modes is greater than a threshold corresponding to the corresponding parameter, the electronic device considers that there is a great framing parameter difference between the two photographing modes. Values of the first threshold, the second threshold, and the third threshold may be determined based on an actual implementation. For example, the first threshold may be a value of 5% of the smaller of ISOs of the two photographing modes, and the second threshold may be, for example, 100 milliseconds (ms).

Figure 5B:
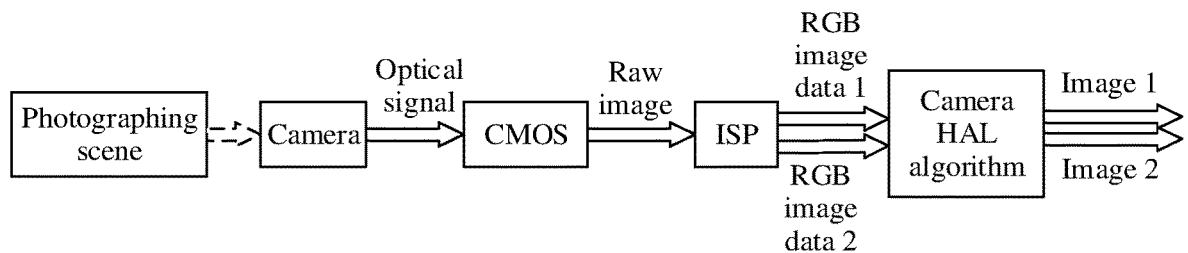
FIG. 5B is a schematic diagram of an example processing procedure for generating an image by an electronic device according to an embodiment of this application.

For example, in a scenario in which framing parameters of two photographing modes are close, as shown in FIG. 5B, the electronic device invokes at least two groups of cameras to obtain optical signals of a photographed object, and then converts the optical signals into raw images by using the CMOS. Then the electronic device separately performs ISP processing on the raw images according to ISP algorithms corresponding to the two photographing modes, to separately obtain RGB image data 1 and RGB image data 2. The RGB image data 1 is, for example, obtained by performing processing according to an ISP algorithm of a first photographing mode of the two photographing modes, and the RGB image data 2 is, for example, obtained according to an ISP algorithm of a second photographing mode of the two photographing modes. Then the electronic device processes the RGB image data 1 according to a camera HAL algorithm of the first photographing mode to obtain an image 1 of the photographing scene, and processes the RGB image data 2 according to a camera HAL algorithm of the second photographing mode to obtain an image 2 of the photographing scene. In this implementation, when framing parameters of at least two photographing modes are close, the electronic device may perform framing only once, so that photographing resources can be saved.

In a scenario in which framing parameters of two photographing modes are different, the electronic device separately performs photographing in the photographing scene twice according to the two photographing modes. Imaging processes at the two times of photographing are similar to those in FIG. 5A, and details are not described herein.

In addition, when performing photographing in the night mode, the electronic device may receive a photographing instruction input by the first user by touching and holding a photographing trigger button. Then the electronic device may perform photographing for a plurality of times, and framing parameters at the plurality of times of photographing are different. Further, the electronic device may obtain a plurality of groups of image data of the photographing scene, and then the electronic device generates a night scene image of the photographing scene based on the plurality of groups of image data. Details are not described herein.

It may be understood that the foregoing framing-related embodiments are described merely for illustrative purposes and do not constitute any limitation on this application. In some other embodiments, when the electronic device performs photographing in more than two photographing modes, a determining mode and a framing mode of the electronic device are similar to those in the foregoing embodiments. Details are not described herein.

In some other embodiments, in a multi-person photographing scene illustrated in FIG. 4B, the electronic device may obtain framed image data of the photographing scene by performing photographing once in the portrait mode. Further, the electronic device may perform processing such as background blurring, beautification, and resurfacing on the image data by using each target photographed object (that is, a target person) as a photographed subject, to obtain an image with each target person as a photographed subject.

In this implementation, the electronic device may obtain a depth image and a color image of a portrait photographing scene by performing framing only once, and further achieve an imaging effect with each target person as a subject by performing different subsequent processing. In comparison with some implementations in a conventional technology in which every person is separately photographed as a subject, in this embodiment, there is no need to perform photographing for a plurality of times, and for the multi-person photographing scene, a subject person can be used as a center for beautification, noise reduction, background blurring, and the like based on a salience condition of the person, thereby achieving a better photographing effect.

Further, after obtaining at least one image by performing photographing, the electronic device may display the at least one image to the user in a stacking mode. A display effect of the at least one image in the interface of the electronic device may be shown in FIG. 2B-1, FIG. 2C-1, or FIG. 2C-3. Afterward, if the electronic device receives a dynamic display instruction input by the user, the electronic device may control the at least one image to be cyclically displayed at a frontmost end. The electronic device may further receive another instruction input by the user, and perform an operation corresponding to the corresponding instruction, for example, operation scenarios corresponding to FIG. 2B-2 to FIG. 2B-7, FIG. 2C-2, and FIG. 2C-4.

In summary, in the implementation of this embodiment, the electronic device can determine, based on the photographed object in the photographing scene, a photographing mode or a target person that better matches the photographing scene, and further generate an image by using the determined photographing mode or the target person, to obtain a plurality of images with different imaging effects. It can be learned that the electronic device in this embodiment can autonomously determine a photographing mode that better matches the photographing scene. This not only achieves high intelligence, but also can obtain a plurality of images with different imaging effects by performing photographing once, thereby saving photographing resources and improving user experience.

The following describes a photographing method in an embodiment of this application with reference to an example.

For example, a smartphone 200 is used as an example for description. The smartphone 200 is, for example, provided with a front-facing camera and a rear-facing camera. For example, in the following embodiment, the smartphone 200 performs photographing by using the rear-facing camera. A camera app is installed on the smartphone 200.

Figure 6A:
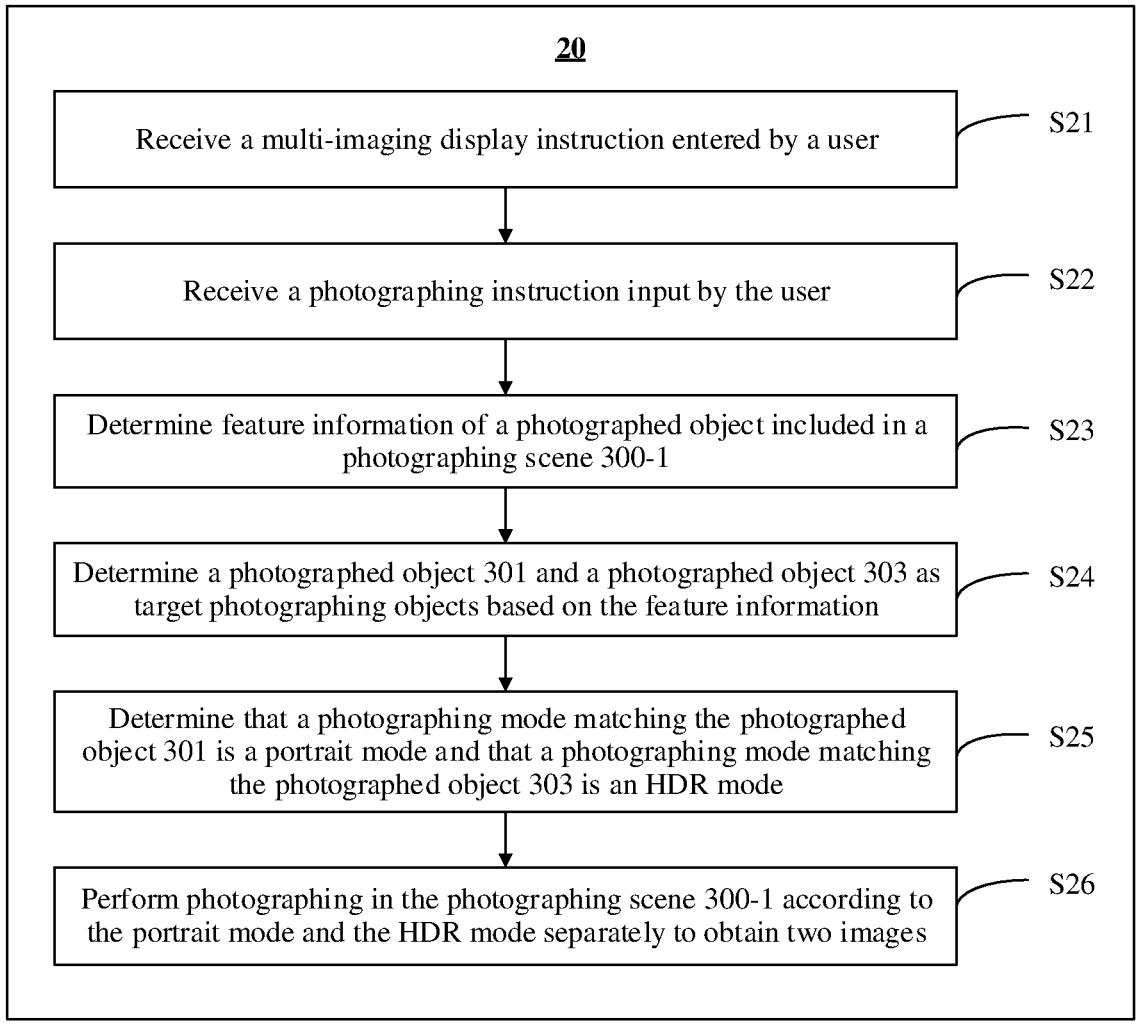
FIG. 6A is a method flowchart of a photographing method 20 according to an embodiment of this application.

FIG. 6A illustrates a method flowchart of a photographing method 20. The photographing method 20 (referred to as the method 20) is, for example, an embodiment in a scenario in which a plurality of photographing modes is used. A photographing scene in this embodiment is, for example, the photographing scene 300-1 illustrated in FIG. 4A.

The method 20 includes the following steps.

Step S21: Receive a multi-imaging display instruction input by a user.

In this embodiment, for example, the user sets the smartphone 200 to display two images, and the user does not select another photographing mode. For a process in which the user sets the multi-imaging effect display of the smartphone 200, refer to the embodiments illustrated in FIG. 2A-1, FIG. 2A-2, and FIG. 2A-4. Details are not described herein.

It should be noted that, in some other embodiments, the user may autonomously select a photographing mode and set to display two images.

Step S22: Receive a photographing instruction input by the user.

After setting the smartphone 200 to display two images, the user may trigger the smartphone 200 to perform photographing. For a man-machine interaction process in which the user inputs the photographing instruction to the smartphone 200, refer to the embodiment in FIG. 2A-5. Details are not described herein.

Step S23: Determine feature information of a photographed object included in a photographing scene 300-1.

For example, in the photographing scene 300-1, a confidence level of a photographed object 301 being a person is 0.999, an image size is 0.4, and a distance between the photographed object 301 and the smartphone 200 is 0.5. A confidence level of a photographed object 302 being a dog is 0.999, an image size is 0.1, and a distance between the photographed object 302 and the smartphone 200 is 0.2. A confidence level of a photographed object 303 being a lawn is 0.998, an image size is 0.6, and a distance between the photographed object 303 and the smartphone 200 is 0.4.

For an algorithm and a process for determining the feature information by the smartphone 200, refer to the foregoing embodiment. Details are not described herein.

Step S24: Determine the photographed object 301 and the photographed object 303 as target photographed objects based on the feature information.

For example, the smartphone 200 separately calculates, according to an algorithm P=0.33x+0.33y+0.34z, probabilities that the photographed object 301, the photographed object 302, and the photographed object 303 are used as photographed subjects, and obtains a probability 0.632 that the photographed object 301 is used as a photographed subject, a probability 0.431 that the photographed object 302 is used as a photographed subject, and a probability 0.663 that the photographed object 303 is used as a photographed subject. 0.663 is greater than 0.632, and 0.632 is greater than 0.431. The smartphone 200 sequentially selects, in descending order of probabilities, photographed objects whose probabilities are 0.663 and 0.632 as target photographed objects. In other words, the smartphone 200 determines the photographed object 301 and the photographed object 303 as target photographed objects. x is a confidence level of each photographed object, y is an image size of each photographed object, and z is a distance between each photographed object and the smartphone 200.

Step S25: Determine that a photographing mode matching the photographed object 301 is a portrait mode and that a photographing mode matching the photographed object 303 is an HDR mode.

Step S26: Perform photographing in the photographing scene 300-1 according to the portrait mode and the HDR mode separately to obtain two images.

An imaging effect of one of the two images corresponds to the portrait mode, and an imaging effect of the other image corresponds to the HDR mode.

In this embodiment, the smartphone 200 detects whether an ISO difference between the portrait mode and the HDR mode is less than a first threshold, whether an exposure time difference is less than a second threshold, and whether a 3A parameter difference is less than a third threshold. For example, the foregoing several differences between the portrait mode and the HDR mode are all less than corresponding thresholds. The smartphone 200 obtains, for example, image data of the photographing scene 300-1 by using framing parameters in the HDR mode, and then generates the two images according to imaging mechanisms in the portrait mode and the HDR mode respectively.

Further, the smartphone 200 may display the two images in a stacking mode, and then may perform, in response to an instruction of the user, operations such as dynamically displaying the images and saving the images. For details, refer to FIG. 2B-1 to FIG. 2C-4. Details are not described herein.

Figure 6B:
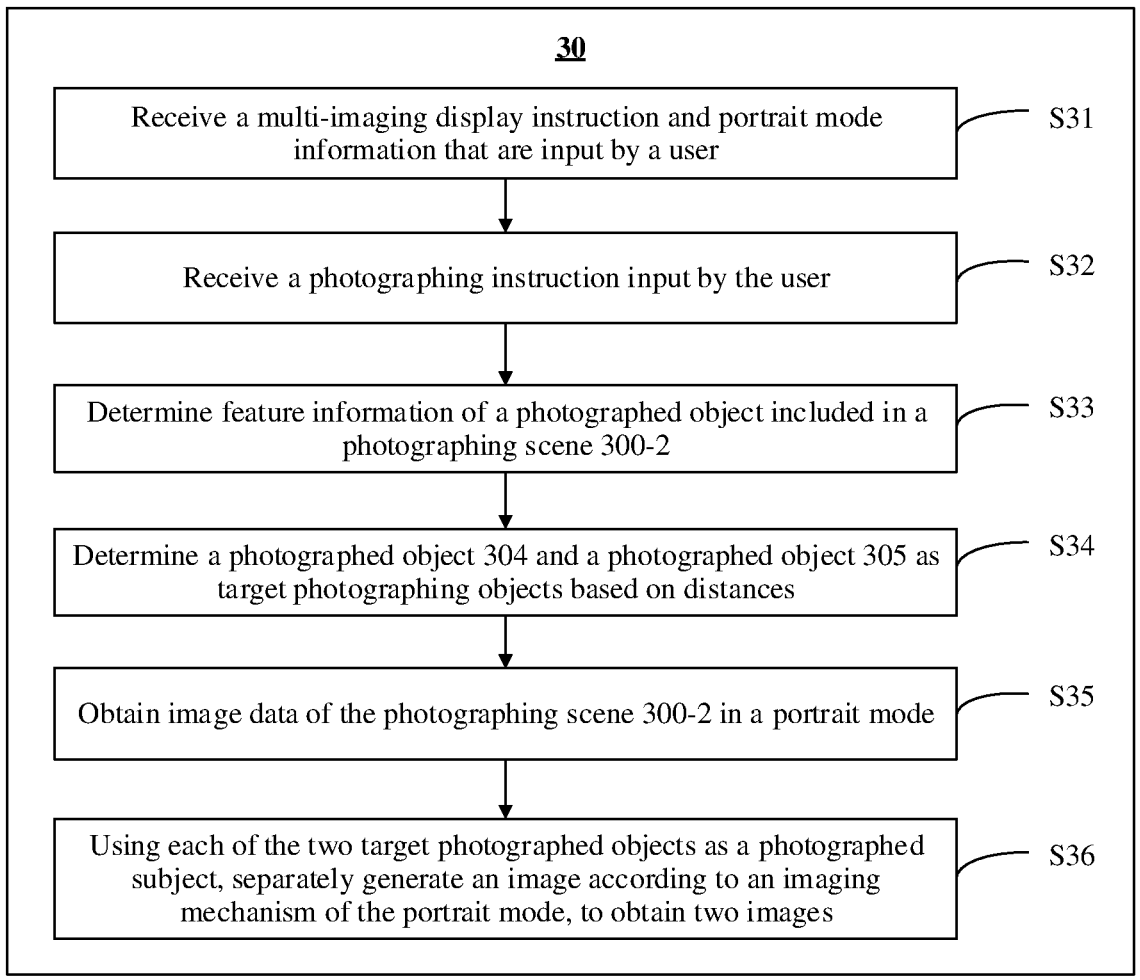
FIG. 6B is a method flowchart of a photographing method 30 according to an embodiment of this application.

FIG. 6B illustrates a method flowchart of a photographing method 30. The photographing method 30 (referred to as the method 30) is, for example, an embodiment in a multi-person scene. A photographing scene in this embodiment is, for example, the photographing scene 300-2 illustrated in FIG. 4B.

The method 30 includes the following steps.

Step S31: Receive a multi-imaging display instruction and portrait mode information that are input by a user.

Step S32: Receive a photographing instruction input by the user.

In this embodiment, for example, the user sets a smartphone 200 to display two images. For an operation process of the user, refer to the embodiments illustrated in FIG. 2A-1 to FIG. 2A-5. Details are not described herein.

Step S33: Determine feature information of a photographed object included in a photographing scene 300-2.

For example, in the photographing scene 300-2, confidence levels of a photographed object 304, a photographed object 305, a photographed object 306, and a photographed object 307 being persons are all 0.999. An image size of the photographed object 304 is 0.2, and a distance between the photographed object 304 and the smartphone 200 is 0.2. An image size of the photographed object 305 is 0.2, and a distance between the photographed object 305 and the smartphone 200 is 0.3. An image size of the photographed object 306 is 0.15, and a distance between the photographed object 306 and the smartphone 200 is 0.5. An image size of the photographed object 307 is 0.12, and a distance between the photographed object 306 and the smartphone 200 is 0.6.

For an algorithm and a process for determining the feature information by the smartphone 200, refer to the foregoing embodiment. Details are not described herein.

Step S34: Determine the photographed object 304 and the photographed object 305 as target photographed objects based on the distances.

In this embodiment, the target photographed objects are also referred to as target persons. The smartphone 200 may determine two target photographed objects from the photographing scene 300-2 in ascending order of distances, that is, may determine the photographed object 304 and the photographed object 305 as target photographed objects.

Step S35: Obtain image data of the photographing scene 300-2 in a portrait mode.

Step S36: Using each of the two target photographed objects as a photographed subject, separately generate an image according to an imaging mechanism of the portrait mode, to obtain two images.

For example, when using the photographed object 304 as a photographed subject, the smartphone 200 performs beautification and resurfacing processing on the photographed object 304, and performs blurring processing on all other objects than the photographed object 304, to obtain an image. When using the photographed object 305 as a photographed subject, the smartphone 200 performs beautification and resurfacing processing on the photographed object 305, and performs blurring processing on all other objects than the photographed object 305, to obtain another image.

It may be understood that FIG. 6A and FIG. 6B are described merely for illustrative purposes and do not constitute any limitation on the technical solutions of this application. In some other embodiments, the electronic device may be another device on which a camera is disposed, for example, a tablet computer. The electronic device may perform photographing by using a front-facing camera. In addition, this application is also applicable to other scenarios. Details are not described herein again. In addition, this specification does not show all implementation scenarios to which this application is applicable. In other implementation scenarios, other implementation means based on the technical ideas of this application are used, which shall also fall within the protection scope of this application.

In summary, in the technical solution in this embodiment, the electronic device can determine, based on the photographed object in the photographing scene, a photographing mode or a target person that better matches the photographing scene, and further generate an image by using the determined photographing mode or the target person, to obtain a plurality of images with different imaging effects. It can be learned that the electronic device in this embodiment can autonomously determine a photographing mode that better matches the photographing scene. This not only achieves high intelligence, but also can obtain a plurality of images with different imaging effects by performing photographing once, thereby saving photographing resources and improving user experience.

The solutions of the photographing methods provided in this application are described separately from perspectives of the hardware structure, the software architecture, and actions performed by software and hardware of the electronic device in the foregoing embodiments. A person skilled in the art should be easily aware that, with reference to the processing steps described in embodiments disclosed in this specification, such as performing calculation on the feature information, determining the target photographing mode, and processing the image of the photographing scene, this application can be implemented not only by hardware or a combination of hardware and computer software. Whether a function is performed by hardware or hardware driven by computer software depends on a particular application and a design constraint of the technical solutions. A person skilled in the art may use different methods to implement the described functions for each particular application, but it should not be considered that the implementation goes beyond the scope of embodiments of this application.

Figure 7A:
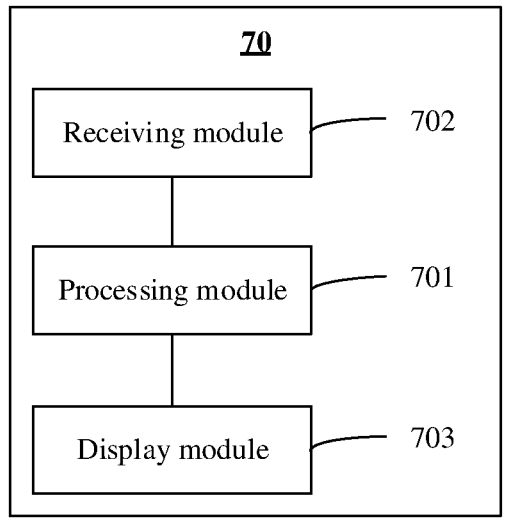
FIG. 7A is a schematic diagram of example composition of an electronic device 70 according to this application.

For example, the electronic device 100 may implement the foregoing corresponding functions in a form of a functional module. As shown in FIG. 7A, an electronic device 70 may include a processing module 701, a receiving module 702, and a display module 703. The electronic device 70 may be configured to perform functions of the electronic device in FIG. 2A-1 to FIG. 6B.

For example, the processing module 701 may be configured to determine feature information of each of at least one photographed object included in a photographing scene, where the feature information includes one or a combination of more of the following: a confidence level of the photographed object, a distance between the photographed object and a camera, and an image size. The processing module 701 may be further configured to determine at least one target photographing mode based on the feature information of each of the at least one photographed object. The receiving module 702 may be configured to receive a first photographing instruction input by a first user. The processing module 701 may be further configured to obtain at least one image of the photographing scene in response to the first photographing instruction, where an imaging effect of the at least one image corresponds to the at least one target photographing mode. The display module 703 may be configured to display the at least one image.

Figure 7B:
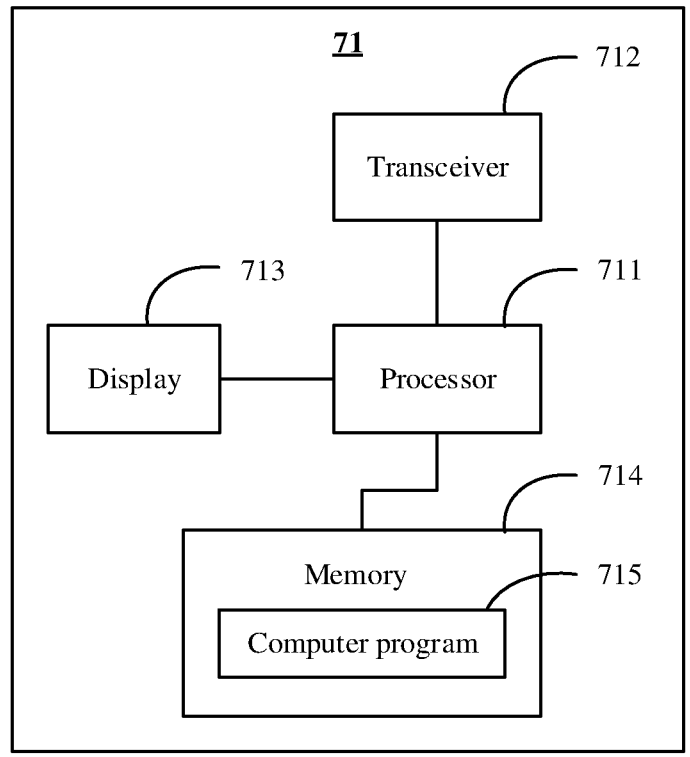
FIG. 7B is a schematic diagram of an example structure of an electronic device 71 according to this application.

It may be understood that the foregoing module division is merely logical function division. In an actual implementation, all or some modules may be integrated into a physical entity, or the modules may be physically separated. For example, a function of the processing module 701 may be integrated into a processor for implementation, a function of the receiving module 702 may be integrated into a transceiver for implementation, and a function of the display module 703 may be integrated into a display for implementation. As shown in FIG. 7B, an electronic device 71 may include a processor 711, a transceiver 712, a display 713, and a memory 714. The memory 714 is coupled to the processor 711. The memory 714 stores a computer program 715 necessary for the electronic device 71. The processor 711 is configured to invoke the computer program 715 to perform the operations of the electronic devices in FIG. 2A-1 to FIG. 6B. The transceiver 712 is configured to receive various instructions input by a user. The display 713 is configured to display an image shot by the electronic device 71. Details are not described herein again.

For specific content, refer to descriptions related to the electronic device in the corresponding embodiments in FIG. 2A-1 to FIG. 6B. Details are not described herein again.

In a specific implementation, corresponding to the electronic device, this application further provides a computer storage medium. The computer storage medium disposed in any device may store a program. When the program is executed, some or all of the steps in the embodiments including the photographing methods provided in FIG. 2A-1 to FIG. 6B can be implemented. A storage medium in any device may be a magnetic disk, an optical disc, a read-only memory (ROM), a random access memory (RAM), or the like.

One or more of the modules or units can be implemented by software, hardware, or a combination of software and hardware. When any one of the foregoing modules or units is implemented by software, the software exists in a form of a computer program instruction, and is stored in the memory. The processor may be configured to execute the program instruction and implement the foregoing method procedure. The processor may include but is not limited to at least one of the following: various computing devices that run software, such as a central processing unit (CPU), a microprocessor, a digital signal processor (DSP), a microcontroller unit (MCU), or an artificial intelligence processor. Each computing device may include one or more cores for executing software instructions to perform operations or processing. The processor may be built in an SoC (system-on-chip) or an application-specific integrated circuit (ASIC), or may be an independent semiconductor chip. The processor may further include a necessary hardware accelerator, such as a field programmable gate array (FPGA), a PLD (programmable logic device), or a logic circuit that implements special logic operations, in addition to the core for executing software instructions to perform operations or processing.

When the foregoing modules or units are implemented by using hardware, the hardware may be any one or any combination of a CPU, a microprocessor, a DSP, an MCU, an artificial intelligence processor, an ASIC, an SoC, an FPGA, a PLD, a dedicated digital circuit, a hardware accelerator, or a non-integrated discrete device, which can run necessary software or perform the foregoing method procedures independently of software.

When implemented by using software, the foregoing modules or units may be implemented completely or partially in a form of a computer program product. The computer program product includes one or more computer instructions. When the computer program instructions are loaded and executed on a computer, the procedure or functions according to embodiments of the present invention are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The available medium may be a magnetic medium (for example, a floppy disk, a hard disk, or a magnetic tape), an optical medium (for example, a DVD), a semiconductor medium (for example, a solid state disk (SSD)), or the like.

It should be understood that sequence numbers of the foregoing processes do not mean execution sequences in embodiments of this application. The execution sequences of the processes should be determined based on functions and internal logic of the processes, and should not constitute any limitation on implementation processes of embodiments of this application.

All parts in this specification are all described in a progressive manner, for same or similar parts in embodiments, refer to these embodiments, and each embodiment focuses on a difference from other embodiments. Especially, apparatus and system embodiments are basically similar to a method embodiment, and therefore are described briefly; for related parts, refer to partial descriptions in the method embodiment.

The objectives, technical solutions, and benefits of the present invention are further described in detail in the foregoing specific embodiments. It should be understood that the foregoing descriptions are merely specific embodiments of the present invention, but are not intended to limit the protection scope of the present invention. Any modification, equivalent replacement, or improvement made within the spirit and principle of the present invention shall fall within the protection scope of the present invention.

What is claimed is:

1. A photographing method, comprising:
determining feature information of each of at least one photographed object comprised in a photographing scene, wherein the feature information comprises a confidence level of the photographed object, a distance between the photographed object and a camera, and an image size of the photographed object, wherein the confidence level of the photographed object represents a level of trust of the photographed object being an object of a type;
determining at least one target photographing mode based on the feature information of each of the at least one photographed object, wherein each of the at least one target photographing mode is a mode in which the camera captures an image of the photographing scene by performing photographing; and
obtaining at least one image of the photographing scene in response to a first photographing instruction entered by a user, wherein an imaging effect of the at least one image corresponds to the at least one target photographing mode,
wherein the determining at least one target photographing mode based on the feature information of each of the at least one photographed object comprises:
performing calculation on the feature information of each of the at least one photographed object to obtain a calculation result corresponding to the photographed object; and
sequentially selecting a quantity of photographing modes in descending order of the calculation results to obtain the at least one target photographing mode.

2. The method according to claim 1, wherein
the performing calculation on the feature information of each of the at least one photographed object to obtain a calculation result corresponding to the photographed object comprises:
calculating a comprehensive score E of the feature information of each photographed object according to an algorithm $E=\alpha x+\beta y+\gamma z$, wherein x is the confidence level of the photographed object, y is the image size of the photographed object, z is the distance between the photographed object and the camera, $\alpha$ is a first weight of the confidence level of the photographed object, $\beta$ is a first weight of the image size of the photographed object, $\gamma$ is a first weight of the distance between the photographed object and the camera, and $\alpha$, $\beta$, and $\gamma$ are values greater than 0 and less than 1; and
the sequentially selecting a quantity of photographing modes in descending order of the calculation results to obtain the at least one target photographing mode comprises:
sequentially selecting a quantity of confidence levels in descending order of the comprehensive scores E to obtain at least one target confidence level; and
determining a photographing mode corresponding to the at least one target confidence level as a target photographing mode, to obtain the at least one target photographing mode.

3. The method according to claim 1, wherein
the performing calculation on the feature information of each of the at least one photographed object to obtain a calculation result corresponding to the photographed object comprises:
calculating, according to an algorithm $P=ax+by+cz$, a probability value P that each photographed object is a photographed subject, wherein x is the confidence level of the photographed object, y is the image size of the photographed object, z is the distance between the photographed object and the camera, a is a second weight of the confidence level of the photographed object, b is a second weight of the image size of the photographed object, c is a second weight of the distance between the photographed object and the camera, and all of a, b, and c are values greater than 0 and less than 1; and the sequentially selecting a quantity of photographing modes in descending order of the calculation results to obtain the at least one target photographing mode comprises:

sequentially selecting a quantity of photographing objects in descending order of the probability values P to obtain at least one target photographing object; and determining a photographing mode matched upon determining that each of the at least one target photographing object is used as a photographing subject, to obtain the at least one target photographing mode.

4. The method according to claim 1, wherein the obtaining at least one image of the photographing scene in response to a first photographing instruction entered by a user comprises:

when the at least one target photographing mode comprises at least two target photographing modes, and the at least two target photographing modes are different, obtaining an image of the photographing scene by using each of the at least two target photographing modes, to obtain at least two images of the photographing scene.

5. The method according to claim 4, wherein the obtaining an image of the photographing scene by using each of the at least two target photographing modes comprises:

determining whether framing parameter differences between the at least two target photographing modes are all less than thresholds corresponding to corresponding framing parameters; and upon determining that the framing parameter differences between the at least two target photographing modes are all less than the thresholds corresponding to the corresponding framing parameters, performing framing based on framing parameters of any one of the at least two target photographing modes to obtain framed image data, and separately processing the image data according to image processing algorithms of the at least two target photographing modes to obtain at least two images of the photographing scene; or upon determining that any framing parameter difference between the at least two target photographing modes is greater than a threshold corresponding to a corresponding framing parameter, separately performing framing based on framing parameters of the at least two target photographing modes to obtain two pieces of image data, and processing corresponding image data according to image processing algorithms of the at least two target photographing modes to obtain at least two images of the photographing scene.

6. The method according to claim 4, further comprising: invoking at least two cameras to perform photographing in the at least one target photographing mode.

7. The method according to claim 1, wherein the obtaining at least one image of the photographing scene in response to a first photographing instruction entered by a user comprises:

when the at least one target photographing mode is a portrait mode, sequentially selecting at least two photographed objects from the at least one photographed object in ascending order of distances;

obtaining framed image data of the photographing scene by using the portrait mode; and processing the image data based on the portrait mode by using each of the at least two photographed objects as a photographed subject separately, to obtain at least two images of the photographing scene.

8. The method according to claim 1, wherein after the obtaining at least one image of the photographing scene, the method further comprises:

receiving a first preview instruction input by the user; and displaying the at least one image in a stacking mode, wherein, in the stacking mode, a first image in the at least one image is displayed over a second image in the at least one image and the first image is completely displayed.

9. The method according to claim 8, further comprising:

receiving a first dynamic display instruction input by the user;

controlling the at least one image to be cyclically displayed at a frontmost end of a display;

receiving a first dynamic display stop instruction input by the user; and controlling an image corresponding to the first dynamic display stop instruction to be statically displayed at the frontmost end.

10. The method according to claim 8, further comprising:

receiving a second dynamic display instruction input by the user;

controlling the at least one image to be cyclically displayed at a frontmost end of a display;

receiving a second dynamic display stop instruction input by the user; and controlling an image corresponding to the second dynamic display stop instruction to be statically displayed at the frontmost end.

11. The method according to claim 8, wherein an image displayed at a frontmost end of a display is marked with a photographing mode corresponding to the image.

12. The method according to claim 11, further comprising:

receiving a second photographing instruction input by the user; and performing photographing in the photographing scene by using a photographing mode corresponding to the second photographing instruction.

13. The method according to claim 1, wherein after the obtaining at least one image of the photographing scene, the method further comprises:

receiving a second preview instruction input by the user; and displaying the at least one image in a stacking mode on a first screen, wherein, in the stacking mode, a first image in the at least one image is displayed over a second image in the at least one image and the first image is completely displayed on the first screen.

14. The method according to claim 13, further comprising:

receiving a first gesture instruction input by the user; and controlling an image corresponding to the first gesture instruction to be displayed on a second screen, and controlling an image under the image corresponding to the first gesture instruction to be displayed on the first screen.

15. The method according to claim 13, further comprising:
- receiving a third dynamic display instruction input by the user;
- controlling the at least one image to be cyclically displayed at a frontmost end of the first screen;
- receiving a second gesture instruction input by the user; and
- controlling an image corresponding to the second gesture instruction to be displayed on a second screen.

16. The method according to claim 1, wherein before the determining feature information of each of at least one photographed object comprised in a photographing scene, the method further comprises:
- receiving a first setting instruction input by the user;
- displaying an image quantity setting entry in response to the first setting instruction; and
- receiving, by using the image quantity setting entry, a quantity of target images that are obtained by performing photographing and input by the user, wherein a quantity of the at least one image is greater than or equal to the quantity of target images.

17. An electronic device, comprising a memory and one or more processors, the memory is configured to store computer program code including computer instructions that, when executed by the one or more processors, enable the electronic device to perform operations comprising:
- determining feature information of each of at least one photographed object comprised in a photographing scene, wherein the feature information comprises a confidence level of the photographed object, a distance between the photographed object and a camera, and an image size of the photographed object, wherein the confidence level of the photographed object represents a level of trust of the photographed object being an object of a type;
- determining at least one target photographing mode based on the feature information of each of the at least one photographed object, wherein each of the at least one target photographing mode is a mode in which the camera captures an image of the photographing scene by performing photographing; and
- obtaining at least one image of the photographing scene in response to a first photographing instruction entered by a user, wherein an imaging effect of the at least one image corresponds to the at least one target photographing mode,
- wherein the determining at least one target photographing mode based on the feature information of each of the at least one photographed object comprises:
- performing calculation on the feature information of each of the at least one photographed object to obtain a calculation result corresponding to the photographed object; and
- sequentially selecting a quantity of photographing modes in descending order of the calculation results to obtain the at least one target photographing mode.

18. The electronic device according to claim 17, wherein the obtaining at least one image of the photographing scene in response to a first photographing instruction entered by a user comprises:
- when the at least one target photographing mode comprises at least two target photographing modes, and the at least two target photographing modes are different, obtaining an image of the photographing scene by using each of the at least two target photographing modes, to obtain at least two images of the photographing scene.

19. The electronic device according to claim 18, wherein the obtaining an image of the photographing scene by using each of the at least two target photographing modes comprises:
- determining whether framing parameter differences between the at least two target photographing modes are all less than thresholds corresponding to corresponding framing parameters; and
- upon determining that the framing parameter differences between the at least two target photographing modes are all less than the thresholds corresponding to the corresponding framing parameters, performing framing based on framing parameters of any one of the at least two target photographing modes to obtain framed image data, and separately processing the image data according to image processing algorithms of the at least two target photographing modes to obtain at least two images of the photographing scene; or
- upon determining that any framing parameter difference between the at least two target photographing modes is greater than a threshold corresponding to a corresponding framing parameter, separately performing framing based on framing parameters of the at least two target photographing modes to obtain two pieces of image data, and processing corresponding image data according to image processing algorithms of the at least two target photographing modes to obtain at least two images of the photographing scene.

20. The electronic device according to claim 17, wherein the obtaining at least one image of the photographing scene in response to a first photographing instruction entered by a user comprises:
- when the at least one target photographing mode is a portrait mode, sequentially selecting at least two photographed objects from the at least one photographed object in ascending order of distances;
- obtaining framed image data of the photographing scene by using the portrait mode; and
- processing the image data based on the portrait mode by using each of the at least two photographed objects as a photographed subject separately, to obtain at least two images of the photographing scene.

* * * * *